United States Patent
Saiki et al.

(10) Patent No.: US 10,551,658 B2
(45) Date of Patent: Feb. 4, 2020

(54) IMAGE DISPLAY APPARATUS WITH TOUCH PANEL

(71) Applicant: Mitsubishi Chemical Corporation, Tokyo (JP)

(72) Inventors: Atsushi Saiki, Tokyo (JP); Hiroki Nakamura, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 303 days.

(21) Appl. No.: 15/523,463

(22) PCT Filed: Dec. 10, 2015

(86) PCT No.: PCT/JP2015/084632
§ 371 (c)(1),
(2) Date: May 1, 2017

(87) PCT Pub. No.: WO2016/098677
PCT Pub. Date: Jun. 23, 2016

(65) Prior Publication Data
US 2017/0315396 A1    Nov. 2, 2017

(30) Foreign Application Priority Data

Dec. 17, 2014  (JP) ................................ 2014-254935

(51) Int. Cl.
*G02F 1/1333* (2006.01)
*G06F 3/041* (2006.01)
(Continued)

(52) U.S. Cl.
CPC ............ *G02F 1/13338* (2013.01); *B32B 3/28* (2013.01); *B32B 7/12* (2013.01); *G06F 3/041* (2013.01);
(Continued)

(58) Field of Classification Search
CPC ... G02F 1/13338; G02F 2202/28; B32B 7/12; B32B 3/28; B32B 2457/202;
(Continued)

(56) References Cited

U.S. PATENT DOCUMENTS

2007/0108032 A1    5/2007  Matsumoto et al.
2008/0309642 A1*  12/2008  Nakajima ............... G06F 3/045
                                          345/173
(Continued)

FOREIGN PATENT DOCUMENTS

JP    2003-177241 A    6/2003
JP    2003-342542 A    12/2003
(Continued)

OTHER PUBLICATIONS

International Search Report dated Feb. 23, 2016 for corresponding International Patent Application No. PCT/JP2015/084632.
(Continued)

*Primary Examiner* — Nathan L Van Sell
(74) *Attorney, Agent, or Firm* — Morgan, Lewis & Bockius LLP

(57) ABSTRACT

An image display apparatus that that can easily separate an image display apparatus from a touch panel. The image display apparatus comprises a liquid crystal panel (image display apparatus main body), a touch panel that has a fine, uneven structure on its surface and faces the liquid crystal panel via a gap, and an adhesive member for securing these, the adhesive member comprising a substrate, a first adhesive layer, and a second adhesive layer, wherein an adhesive strength (W1) between the first adhesive layer and the liquid crystal panel is less than an adhesive strength (W3) of the first adhesive layer and the substrate, an adhesive strength (W3') of the second adhesive layer and the substrate, and an adhesive strength (W5) of the second adhesive layer and the touch panel, and wherein a breaking strength (W4) of the substrate is greater than W3' and/or W5.

14 Claims, 4 Drawing Sheets

(51) Int. Cl.
*B32B 3/28* (2006.01)
*B32B 7/12* (2006.01)

(52) U.S. Cl.
CPC .... *B32B 2457/202* (2013.01); *G02F 2202/28* (2013.01)

(58) Field of Classification Search
CPC ....... B32B 27/24; B32B 27/18; B32B 27/325; B32B 27/36; B32B 27/302; B32B 27/365; B32B 27/308; B32B 23/04; B32B 23/08; B32B 27/06; B32B 27/08; B32B 3/30; B32B 2457/208; B32B 2307/412; B32B 2307/584; G06F 3/041; G06F 2203/04103; G06F 3/044; C09J 2201/16; C09J 2201/36; C09J 2201/622; C09J 2203/318; C09J 7/20
See application file for complete search history.

(56) References Cited

U.S. PATENT DOCUMENTS

| | | | |
|---|---|---|---|
| 2009/0091549 A1 | 4/2009 | Matsumoto et al. | |
| 2011/0250375 A1* | 10/2011 | Bries | C09J 133/08 428/41.5 |
| 2013/0040093 A1* | 2/2013 | Horiuchi | C09J 7/40 428/78 |
| 2013/0222284 A1* | 8/2013 | Kim | G06F 3/041 345/173 |
| 2013/0241862 A1 | 9/2013 | Kim et al. | |

FOREIGN PATENT DOCUMENTS

| | | |
|---|---|---|
| JP | 2007-164760 A | 6/2007 |
| JP | 2009-093397 A | 4/2009 |
| JP | 2012-193264 A | 10/2012 |
| JP | 2012-214623 A | 11/2012 |
| JP | 2013-125317 A2 | 6/2013 |
| JP | 2014-005341 A | 1/2014 |
| JP | 2014-016453 A | 1/2014 |
| JP | 2014-502292 A | 1/2014 |
| JP | 2014-218077 A | 11/2014 |
| WO | 2009/038183 A1 | 3/2009 |
| WO | 2013/191106 A1 | 12/2013 |
| WO | 2014/189075 A1 | 11/2014 |

OTHER PUBLICATIONS

Notice of Reasons for Rejection dated Jul. 5, 2016 for corresponding Japanese Patent Application No. 2015-561804.

* cited by examiner

IMAGE DISPLAY APPARATUS WITH TOUCH PANEL

TECHNICAL FIELD

The present invention relates to an image display apparatus with a touch panel. The present application is based upon and claims the benefit of priority to Japanese Application No. 2014-254935, filed Dec. 17, 2014, the entire contents of which are incorporated herein by reference.

BACKGROUND ART

An image display apparatus with a touch panel is structured to have a touch panel on the image-display side of the image display apparatus main body such as a liquid-crystal panel. The input area of the touch panel positioned on the image display apparatus main body corresponds to keys or the like, and touching the input area with fingers or the like allows the user to operate a device (such as a personal computer, cell phone or ATM) connected to the touch panel and image display apparatus main body.

To protect the image display apparatus main body, an image display apparatus with a touch panel is structured to have a slight gap (air layer) between the touch panel and the image display apparatus main body. However, when structured as above, because light reflects on the interface between the touch panel and the air layer and on the interface between the air layer and the image display apparatus main body, the visibility of the image in the display apparatus main body may be lowered.

To suppress a decrease in image visibility, an image display apparatus with a touch panel is proposed to have a fine uneven formation on each of the opposing surfaces of the image display apparatus main body and touch panel (see Patent Literature 1, for example).

CITATION LIST

Patent Literature

Patent Literature 1: JP2013-125317A

SUMMARY OF THE INVENTION

Problems to be Solved by the Invention

To secure a touch panel to an image display apparatus main body, one option is to arrange a spacer between them for the touch panel and the image display apparatus main body to satisfy a predetermined positional relationship by using fixative members such as screws.

In recent years, to respond to a demand for reduced production costs, a new securing method has been sought to replace conventional methods. For example, a touch panel and an image display apparatus main body are laminated using an adhesive member structured to have an adhesive layer on both surfaces of a substrate such as nonwoven fabric and polyurethane foam so as to secure the touch panel and the main body to each other by a simple, low-cost method.

When such a method using an adhesive member is employed, if the touch panel is laminated to a position off the predetermined position of the image display apparatus main body, they need to be detached so that their positional relationship is corrected and the touch panel and the main body are laminated together again by using an adhesive member.

Moreover, after the touch panel and the image display apparatus main body are secured to each other and an image display apparatus with a touch panel is assembled, if a defect is found in either the touch panel or the image display apparatus main body, they need to be detached so as to replace the defective one. Then, another image display apparatus with a touch panel will be assembled.

However, as shown in Patent Literature 1, when a fine uneven formation is arranged on the surface of an image display apparatus main body or a touch panel, the fine uneven formation is in contact with the adhesive layer of the adhesive member, thus significantly increasing the bond strength. Especially, if the pitch of the fine uneven formation is 400 nm or less, the bond strength tends to be greater. Thus, when an adhesive member is used to secure a touch panel and an image display apparatus main body both having a fine uneven formation on their respective surfaces, it may be difficult to detach the touch panel and the image display apparatus main body from each other.

For example, if a fine uneven formation is arranged only on the surface of a touch panel, it is easier to detach the touch panel from the image display apparatus main body compared with a case where a fine uneven formation is also arranged on the surface of the image display apparatus main body.

However, when the image display apparatus main body and the touch panel with a fine uneven formation arranged thereon are detached, the adhesive layer or the substrate may remain on their surfaces, and removal of such residue is difficult. Besides, their surfaces may be damaged during the effort to remove the adhesive layer or substrate.

Since an image display apparatus main body is more expensive than a touch panel, removal of the adhesive layer or substrate from the image display apparatus main body needs to be minimized so that the main body can be used again without damage to its surface. For that purpose, it is crucial for the image display apparatus main body and the touch panel to be detached in such a way that the adhesive member is peeled at the interface with the image display apparatus main body so that the adhesive layer remains on the touch panel side.

However, even if the adhesive member remains on the touch panel side, the bond strength is greater on the touch panel surface where a fine uneven formation is arranged. Therefore, it is also difficult to remove (peel) the adhesive member from the touch panel. Moreover, the touch panel surface may be damaged during the removal effort.

As described above, when a touch panel and an image display apparatus main body are laminated off the intended position, it is necessary to detach them, remove the old adhesive member, and secure the touch panel and the main body again by using a new adhesive member. However, a touch panel with a fine uneven formation on its surface makes it hard to remove the adhesive member remaining on such a surface. When the adhesive member is unable to be removed, it is necessary to bring in a new touch panel and assemble another image display apparatus with a touch panel.

In addition, after an image display apparatus with a touch panel is assembled, if a defect is found, for example, on the image display apparatus main body, it is necessary to detach the touch panel and the image display apparatus main body, and the touch panel needs to be laminated to another image display apparatus main body. If a fine uneven formation is arranged on the touch panel surface, it may be difficult to remove the adhesive member remaining on the surface. Thus, if the residue of adhesive layer cannot be removed, the detached touch panel is not usable even if the touch panel itself has no defect.

As described, using a touch panel with a fine uneven formation arranged on its surface contributes to providing an image display apparatus with a touch panel where a decrease in visibility is suppressed. However, it is difficult to efficiently produce such an image display apparatus with a touch panel.

The present invention was carried out to solve the aforementioned problems. Its objective is to provide an image display apparatus with a touch panel having a fine uneven formation on its surface, the image display apparatus with a touch panel being structured to make it easier to detach the image display apparatus main body and the touch panel if necessary, and also easier to remove an adhesive member from the surface of the detached touch panel.

Solutions to the Problems

The inventors of the present invention have conducted intensive studies and found that because the substrate of an adhesive member ruptures when a touch panel and an image display apparatus main body are detached from each other, the substrate or the adhesive layer may not be fully removed from the surfaces of the touch panel or the main body, or their surfaces may be damaged during the effort to remove residue. Namely, the inventors have found if appropriate relationships are satisfied among the bond strength between the touch panel and the adhesive member, the bond strength between image display apparatus main body and the adhesive member, the bond strength between the adhesive layer and the substrate of the adhesive member, and the rupture strength of the substrate of the adhesive member, it is easier to detach the image display apparatus main body and the touch panel, while it is also easier to remove the adhesive member remaining on the surface of the detached touch panel. Accordingly, the present invention has been completed.

The present invention is characterized by the following aspects.

[1] A laminate structured to have a first member having multiple convex portions on its surface, a second member positioned to face the first member with a space disposed in between, and an adhesive member to secure the first member and the second member. In such a laminate, the average height of the multiple convex portions is 80 nm to 500 nm; the average distance between adjacent convex portions is 20 nm to 400 nm; the aspect ratio (average height/pitch) is 0.8 to 5.0; the adhesive member is structured to have a substrate, a first adhesive layer laminated on one surface of the substrate, and a second adhesive layer laminated on the other surface of the substrate; the first member and the second member are secured by setting the first adhesive layer to be in contact with the surface of the first member having multiple convex portions and setting the second adhesive layer to be in contact with the surface of the second member; when the strength of the substrate of the adhesive member is set as (F1), the peel strength between the first member and the adhesive member as (F2), and the peel strength between the second member and the adhesive member as (F3), (F1)~(F3) satisfy the following relationships.

$$F2 < 13\ N/10\ mm$$

$$F3 < F2 < F1$$

[2] The laminate according to [1], in which the rupture strength of the substrate of the adhesive member is at least 100 MPa.

[3] The laminate according to [1], in which when the bond strength between the first member and the first adhesive layer is set as (W1), the rupture strength of the first adhesive layer as (W2), the bond strength between the substrate and the first adhesive layer as (W3), the bond strength between the substrate and the second adhesive layer as (W3'), the rupture strength of the second adhesive layer as (W2'), and the bond strength between the second adhesive layer and the second member as (W5), (W5) is less than any of (W1), (W2), (W2'), (W3) and (W3').

[4] The laminate according to [1], in which when the bond strength between the first member and the first adhesive layer is set as (W1), the rupture strength of the first adhesive layer as (W2), and the bond strength between the substrate and the first adhesive layer as (W3), (W1) is less than either of (W2) and (W3).

[5] The laminate according to [1], in which when the bond strength between the first member and the first adhesive layer is set as (W1), the rupture strength of the first adhesive layer as (W2), and the bond strength between the substrate and the first adhesive layer as (W3), (W2) is less than either of (W1) and (W3).

[6] The laminate according to [5], in which the adhesive agent of the first and second adhesive layers is soluble in water or alcohol.

[7] The laminate according to [1], in which when the bond strength between the first member and the first adhesive layer is set as (W1), the rupture strength of the first adhesive layer as (W2), and the bond strength between the substrate and the first adhesive layer as (W3), (W3) is less than either of (W1) and (W2).

[8] The laminate according to [7], in which the adhesive agent of the first and second adhesive layers is soluble in water or alcohol.

[9] The laminate according to [3], in which (W5) is 1 to 13 N/10 mm.

[10] The laminate according to [1], in which the bond strength between the first adhesive layer and the first member is 3 to 14 N/10 mm.

[11] The laminate according to [1], in which the adhesive agent of the first and second adhesive layers is soluble in water or alcohol.

[12] The laminate according to [1], in which the first and second adhesive layers are made of the same adhesive agent.

[13] The laminate according to [1], in which on the side of the first member having multiple convex portions, the refractive index continuously increases from the tip to the bottom of multiple convex portions.

[14] The laminate according to any of [1] to [13], in which the first member is a touch panel, the second member is an image display apparatus main body, and the multiple convex portions are formed on the touch panel surface facing the image display apparatus main body.

The present invention is also characterized by the following aspects.

(1) An image display apparatus with a touch panel structured to have an image display apparatus main body, a touch panel positioned to face the image-display side of the image display apparatus main body with a space disposed in between, and an adhesive member for securing the image display apparatus main body and the touch panel together. A fine uneven formation with a pitch of no greater than 400 nm is formed on the touch panel surface facing the image display apparatus main body; the adhesive member has a substrate, a first adhesive layer laminated on one surface of the substrate, and a second adhesive layer laminated on the other surface of the substrate; the image display apparatus main body and the touch panel are secured by setting the first adhesive layer to be in contact with the surface on the image-display side of the image display apparatus main body, and by setting the second adhesive layer to be in contact with the surface of the touch panel having the fine uneven formation; the bond strength between the first adhesive layer and the image display apparatus main body is less than any of the bond strength between the first adhesive layer and the substrate, the bond strength between the second adhesive layer and the substrate, and the bond strength between the second adhesive layer and the touch panel; and the rupture strength is greater than at least either the bond strength between the second adhesive layer and the substrate or the bond strength between the second adhesive layer and the touch panel.

(2) The image display apparatus with a touch panel according to (1), in which the fine uneven formation is made of multiple convex portions, the average height of the convex portions is 80 nm to 500 nm, the pitch of the convex portions is 20 nm to 400 nm, and the aspect ratio (average height/pitch) of the convex portions is 0.8 to 5.0.

(3) The image display apparatus with a touch panel according to (1) or (2), in which the bond strength between the first adhesive layer and the image display apparatus main body is 1 to 13 N/10 mm.

(4) The image display apparatus with a touch panel according to any of (1) to (3), in which the bond strength between the second adhesive layer and the touch panel is 3 to 15 N/10 mm.

Effects of the Invention

According to the present invention, in an image display apparatus structured to have a touch panel having a fine uneven formation on its surface, it is easier to detach the image display apparatus main body and the touch panel if necessary, and also it is easier to remove the adhesive member from the touch panel surface.

DETAILED DESCRIPTION OF THE EMBODIMENTS

In the following, the present invention is described in detail.

In the present application, "pores" refer to concavo portions in a fine uneven formation formed in an oxide layer on the surface of an aluminum substrate.

Also, "(meth)acrylate" collectively refers to acrylate and methacrylate, "(meth)acrylic acid" to acrylic acid and methacrylic acid, "(meth)acrylonitrile" to acrylonitrile and methacrylonitrile, and "(meth)acrylamide" to acrylamide and methacrylamide.

In addition, "active energy rays" mean visible lights, ultraviolet rays, electron beams, plasma, thermal rays (infrared rays or the like), and so forth.

Furthermore, "transparent" means being capable of transmitting light having a wavelength of at least 400 nm to 760 nm.

[Image Display Apparatus with Touch Panel]

An image display apparatus with a touch panel related to the present invention (hereinafter, simply referred to as "image display apparatus") is structured to have an image display apparatus main body, a touch panel positioned to face the image-display side of the image display apparatus main body with a space in between, and an adhesive member for securing the image display apparatus main body and the touch panel to each other. The touch panel is structured to have a fine uneven formation with a pitch no greater than 400 nm on the surface facing the image display apparatus main body.

Figure 1:
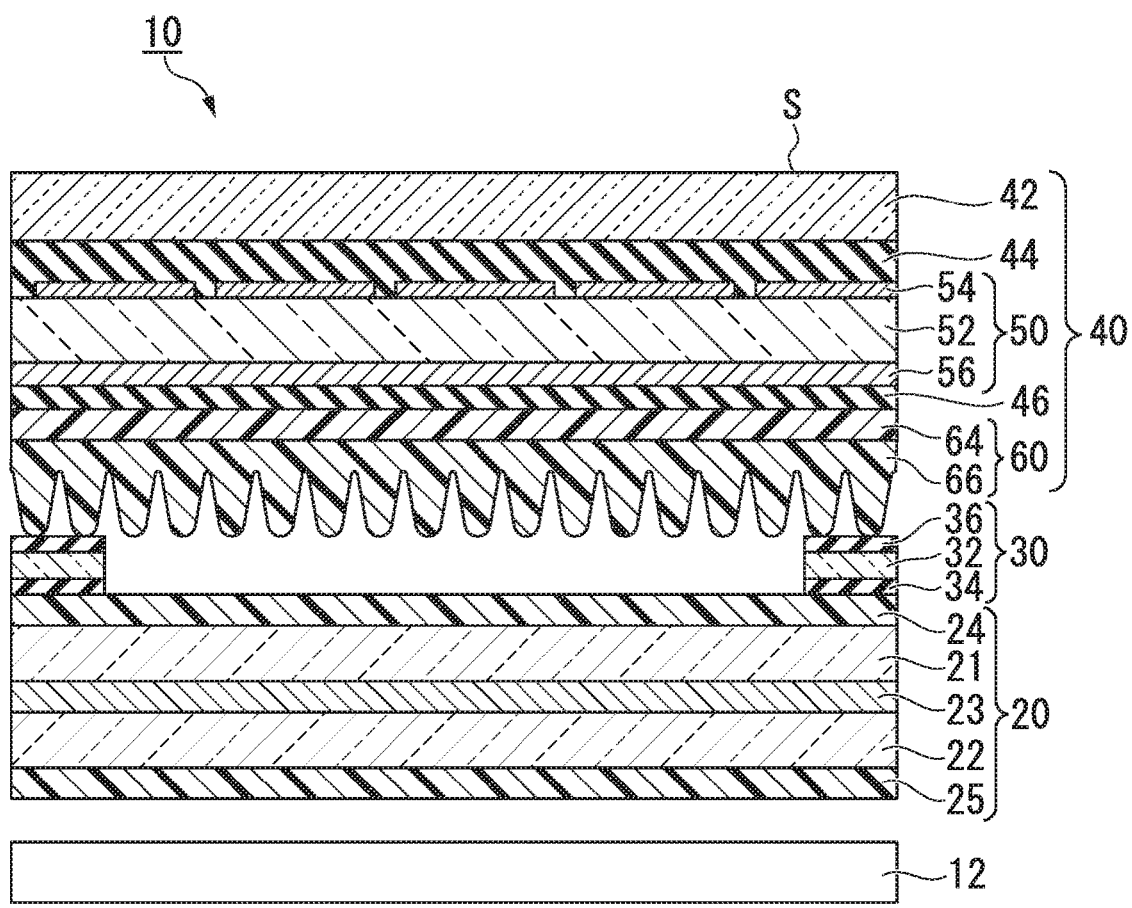
FIG. 1 is a cross-sectional view showing an example of the image display apparatus with a touch panel related to the present invention.

FIG. 1 is a cross-sectional view showing an image apparatus related to the present invention.

The image display apparatus 10 in this example is structured to have liquid-crystal panel 20 as the image display apparatus main body, touch panel 40 positioned to face the image-display side of liquid-crystal panel 20 with a space disposed in between, adhesive member 30 for securing liquid-crystal panel 20 and touch panel 40, and backlight 12 positioned on the other side of liquid-crystal panel 20 opposite where touch panel 40 is positioned. In the following, each member is described.

<Liquid-Crystal Panel>

Liquid-crystal panel 20 is structured to have first glass substrate 21 where a color filter (not shown), transparent electrodes (not shown), alignment film (not shown) and the like are formed, second glass substrate 22 where transparent electrodes (not shown), alignment film (not shown) and the like are formed, liquid-crystal layer 23 sandwiched between first glass substrate 21 and second glass substrate 22, first polarizing film 24 laminated by an adhesive layer (not shown) on a surface of first glass substrate 21 to be positioned opposite liquid-crystal layer 23, and second polarizing film 25 laminated by an adhesive layer (not shown) on a surface of second glass substrate 22 to be positioned opposite liquid-crystal layer 23.

Examples of an adhesive agent for the adhesive layer are known transparent adhesives, transparent binders and the like for use in optical applications.

<Touch Panel>

Touch panel 40 is a capacitive touchscreen to detect positions of a conductor (finger, metal or the like) that comes closer to or makes contact with the input surface S as a change in capacitance. Touch panel 40 is structured to have cover glass 42 having input surface S, electrode substrate 50 laminated by adhesive layer 44 on a side of cover glass 42 to be positioned opposite input surface S, a detector (not shown) electrically connected to the transparent electrode of electrode substrate 50 so as to detect a change of capacitance when a conductor comes closer to or makes contact with input surface S, and low reflection film 60 laminated by adhesive layer 46 on a surface of electrode substrate 50.

(Electrode Substrate)

Electrode substrate 50 is structured to have electrode main body 52, first transparent electrode 54 formed on a surface of substrate main body 52 and having multiple striped electrode patterns extending in a first direction, and second transparent electrode 56 formed on the other surface of substrate main body 52 and having multiple striped electrode patterns extending in a second direction perpendicular to the first direction.

Substrate main body 52 is made of a transparent plate, film, sheet or the like. Examples of the material of substrate main body 52 are glass, acrylic resin, polycarbonate, styrene resin, polyester, cellulose resin (such as triacetyl cellulose), polyolefin, alicyclic polyolefin, and so on.

First transparent electrode 54 and second transparent electrode 56 are made of thin film that transmits light and is conductive.

As for first transparent electrode 54 and second transparent electrode 56, conductive metal oxide thin films or the like may be used. Examples of a conductive metal oxide are tin-doped indium oxides (hereinafter abbreviated as "ITO") and the like.

(Detector)

The detector applies a predetermined voltage to the transparent electrode and detects a change in capacitance between a conductor and the electrode when the conductor comes closer to or makes contact with the input surface so as to detect which position is closer to or made contact with the conductor.

(Low Reflection Film)

Figure 2:
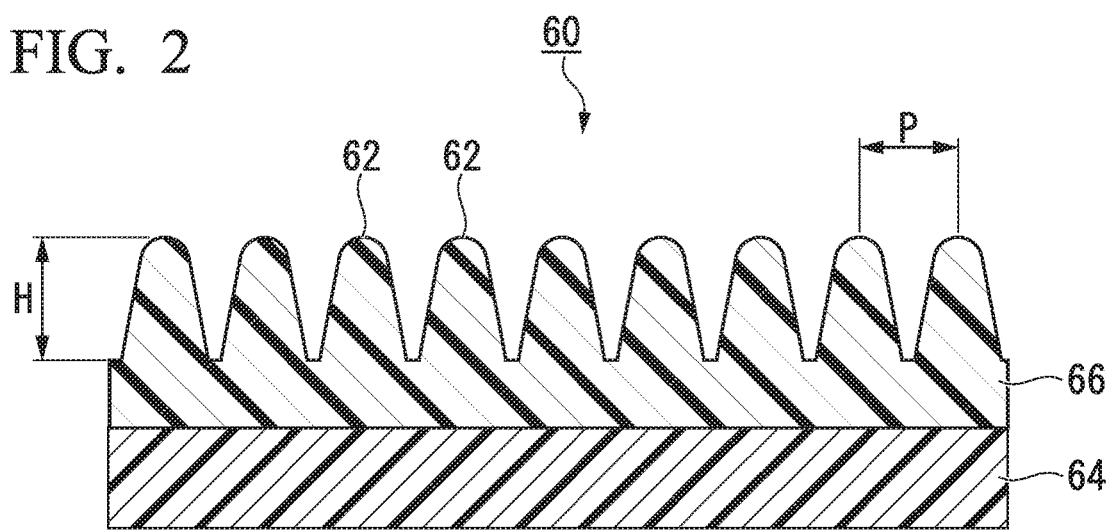
FIG. 2 is a cross-sectional view showing an example of the low reflection film used in the image display apparatus with a touch panel related to the present invention.

As shown in FIG. 2, low reflection film 60 is structured to have base film 64 and cured resin layer 66 having a fine uneven formation made of multiple convex portions 62 formed on a surface of base film 64.

Base film 64 is made of a transparent film. Examples of the material of base film 64 are glass, acrylic resin, polycarbonate, styrene resin, polyester, cellulose resin (such as triacetyl cellulose), polyolefin, alicyclic polyolefin, and the like.

Cured resin layer 66 is a transparent layer made of a cured substance of a later-described active energy ray-curable resin composition, and has a fine uneven formation made of multiple convex portions 62 formed thereon.

The fine uneven formation having multiple convex portions 62 in a substantially conical or pyramid shape (a so-called moth-eye formation) is known to provide anti-reflective effects by continuously increasing the refractive index from that of air to that of the material.

The fine uneven formation is preferred to be formed by transferring multiple pores of a later-described anodic alumina. When formed by transferring multiple pores of anodic alumina, the fine uneven formation exhibits excellent low reflective properties. In addition, it can be formed at low cost on a large scale.

The average height H of convex portion 62 is preferred to be 80 nm to 500 nm, more preferably 120 nm to 400 nm, especially preferably 150 nm to 300 nm. When an average height H of convex portions 62 is at least 80 nm, a sufficiently low reflectance is observed, and the reflectance is less likely to depend on wavelength. When an average height H of convex portions 62 is no greater than 500 nm, scratch resistance of the convex portions is enhanced.

The average height H of convex portions 62 is obtained by measuring the distance from the apex of a convex portion 62 to the bottom of a concave positioned between convex portions 62, and by calculating the average value from the heights obtained at 50 spots.

The pitch P of convex portions 62 (namely, average distance between adjacent convex portions 62) is set to be no greater than the wavelength of visible light, that is, no greater than 400 nm, to make the reflection of visible light sufficiently low. When convex portions 62 are formed by transferring multiple pores of anodic alumina, pitch P of convex portions 62 is approximately 100 nm. Thus, pitch P is more preferred to be no greater than 200 nm, especially preferably no greater than 150 nm. Considering the ease of forming convex portions 62, pitch P of convex portions 62 is preferred to be at least 20 nm.

Pitch P of convex portions 62 is obtained by measuring the distance between adjacent convex portions 62 (from the center of a convex portion 62 to the center of its adjacent convex portion 62), and by calculating the average value from the pitches obtained at 50 spots.

The aspect ratio of a convex portion 62 (average height H of convex portions 62/pitch P of convex portions 62) is preferred to be 0.8 to 5.0, more preferably 1.2 to 4.0, especially preferably 1.5 to 3.0. If the aspect ratio of convex portions 62 is at least 0.8, a sufficiently low reflectance is achieved. If the aspect ratio of convex portions 62 is no higher than 5.0, the scratch resistance of convex portions 62 is enhanced.

The shape of a convex portion 62 is preferred to be such that the area of its cross section cut in a direction perpendicular to the height direction increases continuously from the outermost surface toward the bottom, namely, the cross-sectional shape of convex portion 62 in a height direction is preferred to be triangular, trapezoidal, bell-shaped or the like.

(Adhesive Layer)

The adhesive agent for adhesive layers 44, 46 may be any known transparent adhesives, transparent binders or the like for use in optical applications.

<Adhesive Member>

Adhesive member 30 is used to secure liquid-crystal panel 20 and touch panel 40 to each other.

Adhesive member 30 is structured to have substrate 32, first adhesive layer 34 laminated on one surface of substrate 32, and second adhesive layer 36 laminated on the other surface of substrate 32. Liquid-crystal panel 20 and touch panel 40 are secured as first adhesive layer 34 makes contact with the display-side surface of liquid-crystal panel 20, and second adhesive layer 36 makes contact with the fine uneven formation-side surface of touch panel 40.

The position to secure liquid-crystal panel 20 and touch panel 40 is not limited specifically, as long as liquid-crystal panel 20 and touch panel 40 are secured to each other without blocking the image coming from liquid-crystal panel 20. A preferred position is on the peripheries of liquid-crystal panel 20 and touch panel 40.

Figure 5:
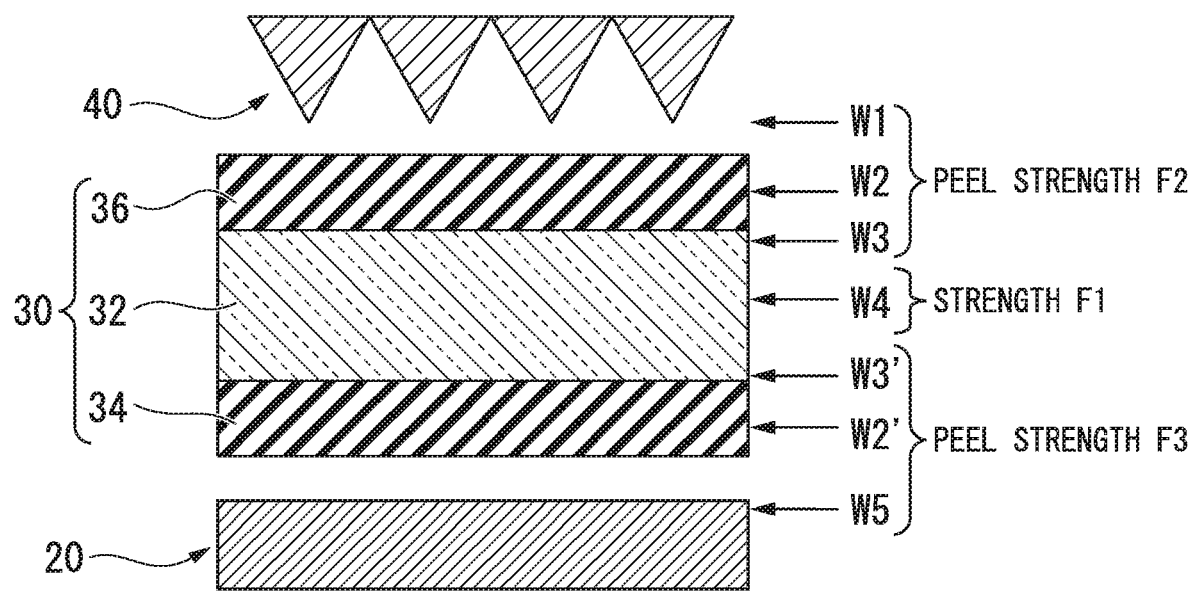
FIG. 5 is a view schematically illustrating the peel strength between an adhesive member and a liquid-crystal panel and the peel strength between the adhesive member and a touch panel.

By referring to FIG. 5, descriptions are provided for the peel strength between adhesive member 30 and liquid-crystal panel 20 and the peel strength between adhesive member 30 and touch panel 40. Adhesive member 30 is set as follows: bond strength (W5) between first adhesive layer 34 and liquid-crystal panel 20 is less than any of rupture strength (W2) of first adhesive layer 34, bond strength (W3) between first adhesive layer 34 and substrate 32, bond strength (W3') between second adhesive layer 36 and substrate 32, rupture strength (W2') of second adhesive layer 36, and bond strength (W1) between second adhesive layer 36 and touch panel 40, while rupture strength (W4) of substrate 32 is set greater than at least bond strength (W3') or bond strength (W5).

As described earlier, when image display apparatus 10 is assembled, if touch panel 40 and liquid-crystal panel 20 are laminated off the intended position, or if a defect is found in either touch panel 40 or liquid-crystal panel 20, it is necessary to detach liquid-crystal panel 20 and touch panel 40 and to reassemble image display apparatus 10.

When rupture strength (W4) is less than any of bond strength (W1), bond strength (W3), bond strength (W3') and bond strength (W5), substrate 32 may rupture during an effort to detach touch panel 40 and liquid-crystal panel 20. As a result, some of ruptured substrate 32 and first adhesive layer 34 remains on the surface of liquid-crystal panel 20, while the rest of ruptured substrate 32 remains on the surface of touch panel 40. For example, when adhesive member 30 is structured to have substrate 32 made of nonwoven fabric or polyurethane foam, ruptured nonwoven fabric or polyurethane and first adhesive layer 34 remain on the surface of liquid-crystal panel 20, while the rest of ruptured nonwoven fabric or polyurethane and second adhesive layer 36 remain on the surface of touch panel 40.

When only first adhesive layer 34 remains on the surface of liquid-crystal panel 20, or when only second adhesive layer 36 remains on the surface of touch panel 40, it is relatively easy to wipe off those first and second adhesive layers 34, 36 by using a cloth soaked with alcohol or the like.

By contrast, when ruptured substrate 32 and first adhesive layer 34 remain on the surface of liquid-crystal panel 20, or when ruptured substrate 32 and second adhesive layer 36 remain on the surface of touch panel 40, pieces of ruptured substrate 32 may damage the surface of liquid-crystal panel 20 or touch panel 40 during an effort to wipe off residue by using a cloth or the like soaked with alcohol. In addition, some of ruptured substrate 32 may absorb alcohol or the like, making it difficult to fully remove first adhesive layer 34 or second adhesive layer 36. Especially, since liquid-crystal panel 20 is more expensive than touch panel 40, it is desired to reduce the amount of adhesive layer and substrate that should be removed from liquid-crystal panel 20 so as to make the liquid-crystal panel reusable without damaging its surface.

For that matter, in adhesive member 30 related to the present invention, bond strength (W1) is set to be less than any of bond strength (W3), bond strength (W3') and bond strength (W5), but strength (W4) is to be greater than at least either bond strength (W3') or bond strength (W5). Thus, during an effort to detach touch panel 40 and liquid-crystal panel 20, peeling occurs at the interface of first adhesive layer 34 and liquid-crystal panel 20 without rupturing substrate 32. Accordingly, it is easier to detach touch panel 40 and liquid-crystal panel 20 in a situation where adhesive member 30 is stuck to touch panel 40. That means adhesive member 30 is less likely to remain on liquid-crystal panel 20, and even if some remains, it would be only a trace (adhesive residue) of first adhesive layer 34. Thus, removal is easier, and damage to the surface of liquid-crystal panel 20 is suppressed. In addition, such a setting makes it easier to predict on which surface adhesive member 30 would remain without actually separating touch panel 40 and liquid-crystal panel 20 from each other, thus simplifying the removal of adhesive member 30.

Adhesive layer 30 is set to have rupture strength (W4) greater than at least either bond strength (W3') or bond strength (W5). Thus, during an effort to remove adhesive member 30 remaining on the surface of touch panel 40, substrate 32 does not rupture and is thought to result in any of situations (i)~(iii) below.

(i) When bond strength (W5) is the least among bond strength (W3), bond strength (W3') and bond strength (W5), peeling occurs at the interface of second adhesive layer 36 and touch panel 40.

(ii) When bond strength (W3') is the least among bond strength (W3), bond strength (W3') and bond strength (W5), peeling occurs at the interface of second adhesive layer 36 and substrate 32.

(iii) When bond strength (W3) is the least among bond strength (W3), bond strength (W3') and bond strength (W5), peeling occurs at the interface of first adhesive layer 34 and substrate 32.

In situation (i), adhesive member 30 tends not to remain on the surface of touch panel 40, and even if it does, there will be only a trace (adhesive residue) of second adhesive layer 36. In situation (ii), only second adhesive layer 36 remains on the surface of touch panel 40. As described earlier, when only second adhesive layer 36 remains on the surface of touch panel 40, the residue is wiped out by using a cloth soaked with alcohol or the like. Accordingly, in situations (i) and (ii), second adhesive layer 36 is removed by wiping the surface of detached touch panel 40 with alcohol or the like. Especially if situation (i) is the result, removal is far easier since only the trace of second adhesive layer 36 should be removed.

On the other hand, in situation (iii), second adhesive layer 36 and substrate 32 remain on the surface of touch panel 40. Since rupture strength (W4) is greater than at least either bond strength (W3') or bond strength (W5), during an effort to remove second adhesive layer 36 and substrate 32 remaining on the surface of touch panel 40, substrate 32 does not rupture, and is likely to result in either situation (iv) or (v) below.

(iv) When bond strength (W3') is less than bond strength (W5), peeling occurs at the interface between second adhesive layer 36 and touch panel 40.

(v) When bond strength (W5) is less than bond strength (W3'), peeling occurs at the interface between second adhesive layer 36 and substrate 32.

In situation (iv), adhesive member 30 tends not to remain on the surface of touch panel 40, and even if it does, there will be only a trace (adhesive residue) of second adhesive layer 36. In situation (v), second adhesive layer 36 remains on the surface of touch panel 40. In either case, second adhesive layer 36 is removed by wiping the surface of the detached touch panel 40 with alcohol or the like, the same as in situations (i) and (ii) above.

Rupture strength (W4) is preferred to be greater than either of bond strength (W3') and bond strength (W5). Also, rupture strength (W4) is preferred to be greater than bond strength (W3).

Moreover, bond strength (W5) is preferred to be less than either of bond strength (W3) and bond strength (W3'). If bond strength (W5) is less than either of bond strength (W3) and bond strength (W3'), situation (i) above will result during an effort to detach adhesive member 30 from touch panel 40. Thus, adhesive member 30 tends not to remain on the surface of touch panel 40, and even if it does, there will be only a trace (adhesive residue) of second adhesive layer 36, which is easier to remove.

In sum, among bond strength (W1), bond strength (W3), bond strength (W3'), bond strength (W5) and rupture strength (W4) set in adhesive layer 30, bond strength (W1) is preferred to be the smallest, bond strength (W5) to be the second smallest, and rupture strength (W4) to be the greatest. Namely, the relationships "bond strength (W1)<bond strength (W5)<bond strength (W3), and bond strength (W3')<rupture strength (W4)" are preferred to be satisfied.

In the above, bond strength (W3) and bond strength (W3') are not limited to satisfy any specific relationship, and it is acceptable for bond strength (W3) and bond strength (W3')

to be the same, for bond strength (W3) to be greater, or for bond strength (W3') to be greater.

Namely, in the present invention, when rupture strength (W4) of substrate 32 is set as (F1), the peel strength between touch panel 40 and adhesive member 30 as (F2), and the peel strength between liquid-crystal panel 20 and adhesive member 30 as (F3), the laminate is structured to satisfy F3<F2<F1.

As described, according to the present invention, liquid-crystal panel 20 and touch panel 40 secured to each other by adhesive member 30 are easily detached from each other. In addition, when adhesive member 30 remaining on touch panel 40 is removed, substrate 32 is unlikely to rupture. Thus, even if second adhesive layer 36 remains on the surface of touch panel 40, its removal is easier.

When first adhesive layer 34 or second adhesive layer 36 remains on the surface of liquid-crystal panel 20 or touch panel 40, ethanol, isobutyl alcohol, isopropyl alcohol or the like may be used for removal.

Bond strength (W1) is preferred to be 1 to 13 N/10 mm. When bond strength (W1) is at least 1 N/10 mm, liquid-crystal panel 20 and touch panel 40 are secured to each other. When bond strength (W1) is no greater than 13 N/10 mm, it is easier to detach liquid-crystal panel 20 and touch panel 40 from each other.

Bond strength (W1) is determined in accordance with JIS Z 0237:2009 (ISO 29862 and ISO 29863). More specifically, after adhesive member 30 is laminated on the display-side surface of liquid-crystal panel 20, bond strength (W1) is measured as the force (peel force) required to be added for peeling adhesive member 30 off the surface of liquid-crystal panel 20 in a 180-degree direction.

Bond strength (W5) is preferred to be 3 to 15 N/10 mm (here, bond strength (W5) is set to be greater than bond strength (W1)). When bond strength (W5) is at least 3 N/10 mm, liquid-crystal panel 20 and touch panel 40 are secured to each other. When bond strength (W5) is no greater than 15 N/10 mm, it is easier to detach liquid-crystal panel 20 and touch panel 40 from each other. Also, it is easier to remove adhesive member 30 from touch panel 40.

Bond strength (W5) is more preferred to be 4 to 14.5 N/10 mm, and even more preferably 5 to 14 N/10 mm.

Bond strength (W5) is determined in accordance with JIS Z 0237:2009 (ISO 29862 and ISO 29863). More specifically, after adhesive member 30 is laminated on low reflection film 60, bond strength (W5) is measured as the force (peel force) required to be added for peeling adhesive member 30 off the surface of low reflection film 60 in a 180-degree direction.

Bond strength (W3), bond strength (W3') and rupture strength (W4) are not limited to specific values as long as adhesive member 30 is structured as above.

Bond strength (W3) is obtained in accordance with JIS Z 0237:2009 (ISO 29862 and ISO 29863). More specifically, adhesive strength (W3) is determined by measuring the force (peel force) required to peel first adhesive layer 34 of adhesive member 30 off the surface of substrate 32 in a 180-degree direction.

The same applies to bond strength (W3'); it is determined as the force (peel force) required to be added for peeling second adhesive layer 36 off the surface of substrate 32 in a 180-degree direction.

Rupture strength (W4) is measured as the force (break force) required to pull and break substrate 32 in a thickness direction.

It is not necessary to specifically obtain the value of break force: when adhesive member 30 is peeled from touch panel 40 and if substrate 32 of adhesive member 30 does not rupture, then rupture strength (W4) is determined to be greater than at least either bond strength (W3') or bond strength (W3).

Bond strength (W1), bond strength (W3), bond strength (W3'), bond strength (W5), and rupture strength (W4) are adjustable by selecting the type of substrate 32, and selecting the type of adhesive agent for first and second adhesive layers 34, 36.

As for the material for substrate 32, it is not limited specifically as long as it makes rupture strength (W4) greater than at least either bond strength (W3') or bond strength (W5). For example, substrates made of polyethylene terephthalate (PET), polycarbonate or the like may be used.

As for the adhesive agent of first and second adhesive layers 34, 36, it is not limited specifically as long as it makes bond strength (W1) less than any of bond strength (W3), bond strength (W3') and bond strength (W5). Examples are acryl-based, urethane-based, silicone-based, rubber-based adhesives and the like.

The adhesive agents of first and second adhesive layers 34, 36 may be the same as or different from each other.

Examples of an adhesive agent are (meth)acryl-based, urethane-based, synthetic rubber-based, natural rubber-based, silicone-based adhesives and the like. Among them, preferred to be used are (meth)acrylic adhesive compositions containing acrylic copolymers made of (meth)acrylate alone or in combination with other monomers as the base polymer, to which are added additives such as tackifying resins and crosslinking agents.

Examples of a $C_1$~$C_{12}$ (meth)acrylate are monomers such as methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, and 2-ethylhexyl (meth)acrylate. They may be used alone or in combination thereof. Among them, preferred are (meth)acrylates having a $C_1$~$C_u$ alkyl group, more preferably, $C_4$~$C_8$ linear or branched-chain (meth)acrylates. Especially preferred is n-butyl acrylate, since it makes it easier to ensure adhesiveness with the adherend, and it exhibits excellent cohesion and excellent resistance to sebum.

The amount of $C_1$~$C_{12}$ (meth)acrylate in an acrylic copolymer is preferred to be 80 to 98.5 mass %, more preferably 90 to 98.5 mass %, of the monomer components of the acrylic copolymer.

The acrylic copolymer used in the present invention may be formed by copolymerizing with a highly polar vinyl monomer. Examples of a highly polar vinyl monomer are hydroxyl group-containing vinyl monomers, carboxyl group-containing vinyl monomers, amide group-containing vinyl monomers and the like. They may be used alone or in combination thereof.

Examples of a hydroxyl group-containing monomer are hydroxyl group-containing (meth)acrylates such as 2-hydroxyethyl (meth)acrylate, 2-hydroxypropyl (meth)acrylate, 4-hydroxybutyl (meth)acrylate, and 6-hydroxyhexyl (meth)acrylate.

Examples of a carboxyl group-containing vinyl monomer are acrylic acid, methacrylic acid, itaconic acid, maleic acid, (meth)acrylic acid dimers, crotonic acid, ethylene oxide-modified succinic acid acrylate and the like. Among them, it is preferred to use acrylic acid as a copolymerizable component.

Examples of an amide group-containing monomer are N-vinylpyrrolidone, N-vinylcaprolactam, acryloyl morpholine, acrylamide, N,N-dimethylacrylamide, and the like.

Examples of other highly polar vinyl monomers are vinyl acetate, ethylene oxide-modified succinic acid acrylate, sulfonate group-containing monomers such as 2-acrylamide-2-methylpropane sulfonic acid.

The content of a highly polar vinyl monomer is preferred to be 1.5 to 20 mass %, more preferably 1.5 to 10 mass %, even more preferably 2 to 8 mass %, of the monomer component of an acrylic copolymer. By setting such a range, it is easier to adjust the cohesion, retention and adhesiveness properties of the adhesive agent.

If an isocyanate crosslinking agent is used, it is preferred to use a hydroxyl group-containing vinyl monomer since it contains a functional group reactive with such a crosslinking agent. Especially preferred are 2-hydroxyethyl (meth)acrylate, 4-hydroxybutyl (meth)acrylate, and 6-hydroxyhexyl (meth)acrylate. The content of a hydroxyl group-containing vinyl monomer reactive with an isocyanate crosslinking agent is preferred to be 0.01 to 1.0 mass %, especially preferably 0.03 to 0.3 mass %, of the monomer component of an acrylic copolymer.

Acrylic copolymers may be obtained by any known polymerization methods such as solution, block, suspension, and emulsion polymerization methods. Considering the water resistance of adhesive agents, solution or block polymerization is preferred. Also, any polymerization initiation methods may be selected, for example, methods using peroxide-based thermal polymerization initiators such as lauroyl peroxide and benzoyl peroxide, and azo-based thermal polymerization initiators such as azobisisobutyronitrile; methods using ultraviolet irradiation using photopolymerization initiators such as acetophenone-based, benzoin ether-based, benzyl ketal-based, acyl phosphine oxide-based, benzoin-based, and benzophenone-based initiators; methods using electron beam irradiation; and the like.

Regarding the molecular weight of the above-mentioned acrylic copolymers, their weight average molecular weight in terms of standard polystyrene is 400,000 to 3,000,000, preferably 800,000 to 2,500,000, when measured by gel permeation chromatography (GPC).

To enhance adhesiveness and surface bonding strength with the adherend, it is preferred to add a tackifying resin to acrylic adhesive compositions related to the present invention. Examples of a tackifying resin are rosins, polymerized rosins, polymerized rosin esters, rosin phenols, stabilized rosin esters, disproportionated rosin esters, hydrogenated rosin esters, terpenes, terpene phenols, petroleum resins, (meth)acrylates, and the like. To be added to an emulsion-type adhesive composition, tackifying resin emulsions are preferred.

For a ratio to blend an acrylic copolymer and a tackifying resin, it is preferred to use a tackifying resin at 5 to 60 parts by mass, more preferably 8 to 50 parts by mass, per 100 parts by mass of an acrylic copolymer. By setting the ratio in such a range, adhesiveness with the adherend is expected to be secured.

To enhance cohesion of the adhesive layer, it is preferred to crosslink the adhesive agent in an acrylic adhesive composition. Examples of a crosslinking agent are isocyanate-based, epoxy-based, metal chelate-based, aziridine-based agents and the like. Among them, it is preferred to use a type of crosslinking agent that is added after the completion of polymerization so as to promote crosslinking reactions. For example, isocyanate-based and epoxy-based crosslinking agents are preferred because of their excellent reactive properties with (meth)acrylic copolymers; more preferred are isocyanate-based crosslinking agents because they enhance adhesiveness with foam substrates.

Examples of an isocyanate crosslinking agent are tolylene diisocyanate, naphthylene-1,5-diisocyanate, hexamethylene diisocyanate, diphenylmethane diisocyanate, xylylene diisocyanate, trimethylolpropane-modified tolylene diisocyanate and the like. Especially preferred are trifunctional polyisocyanate-based compounds such as tolylene diisocyanates and their trimethylolpropane adducts, triphenylmethane diisocyanates, and the like.

As an index of the degree of crosslinking, the value of gel fraction of insoluble substances is measured after the adhesive layer is immersed in toluene for 24 hours. The value of gel fraction is preferred to be 25 to 70 mass %, more preferably 30 to 60 mass %, even more preferably 30 to 55 mass %. If the degree of crosslinking is in such a range, cohesion and adhesion properties are both excellent.

If applicable, known additives may be added optionally to adhesive compositions; for example, plasticizers, softening agents, antioxidants, flame retardants, fibers, balloons or beads made of glass, plastic or the like, fillers made of metal powders, metal oxides, metal nitrides or the like, colorants such as pigments and dyes, leveling agents, thickeners, water repellents, defoaming agents and the like.

In the present invention, the aforementioned low reflection film 60 is arranged on the surface of touch panel 40 to face liquid-crystal panel 20. When laminated to an adhesive layer, low reflection film 60 having a fine uneven formation with pitch P of no greater than 400 nm exhibits greater bond strength than a smooth-surface film. That is thought to be because convex portions of the fine uneven formation bite into the adhesive layer to significantly increase the area of contact with the adhesive layer compared with the contact area when a smooth film is used. Namely, as shown in FIG. 1, when low reflection film 60 is arranged on the surface of touch panel 40 facing liquid-crystal panel 20, reflection on their interface is prevented, thus enhancing the visibility of the image display apparatus, while bond strength (W5) is set greater than bond strength (W1).

As described above, by arranging low reflection film 60 on the surface of touch panel 40, bond strengths (W1) and (W5) are adjusted without changing the type of adhesive agents or bond strengths of first and second adhesive layers 34, 36. Therefore, image display apparatus 10 is assembled without paying any specific attention to the direction of adhesive member 30, thus enhancing the production yield of image display apparatus 10.

<Method for Producing Low Reflection Film>

Figure 3:
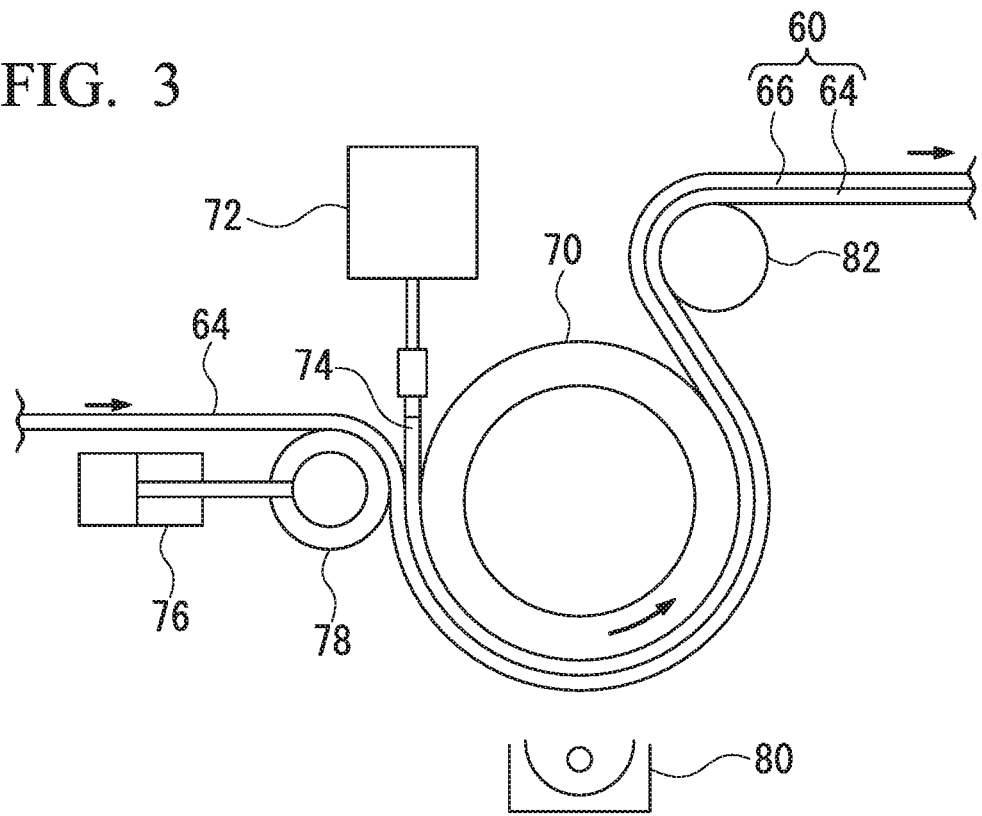
FIG. 3 is a view showing an example of the device for producing a low reflection film.

Low reflection film 60 is produced as follows by using a production apparatus as shown in FIG. 3, for example.

Active energy curable-resin composition 74 is supplied from tank 72 between the surface of a roll-shaped mold 70 having anodic alumina with multiple pores (not shown) formed on its surface, and the surface of belt-like base film 64, moving along the surface of mold 70 by synchronizing to the rotation of mold 70.

Base film 64 and active energy ray curable-resin composition 74 are nipped between mold 70 and nip roll 78 with nip pressure adjusted by air cylinder 76. Accordingly, active energy ray curable-resin composition 74 is homogeneously dispersed between base film 64 and mold 70 and filled in pores of mold 70.

When active energy ray curable-resin composition 74 is sandwiched between base film 64 and mold 70, active energy rays are irradiated on active energy ray curable-resin composition 74 from the side of base film 64 by using active energy ray irradiation device 80 positioned beneath mold 70. Accordingly, active energy ray curable-resin composition 74 is cured, and multiple pores on the surface of mold 70 are transferred and become multiple convex portions (not shown), thus achieving cured resin layer 66 having a fine uneven formation on its surface.

Using release roll 82, base film 64 with cured resin layer 66 formed on its surface is peeled off the mold, and low reflection film 60 is obtained.

As for active energy ray irradiation device 80, a high pressure mercury lamp, a metal halide lamp or the like is preferable. The cumulative amount of light is preferred to be 100 to 10000 mJ/cm$^2$.

(Mold)

Mold 70 is structured to have anodic alumina on its surface. Molds with anodic alumina can be formed into a large-scale mold by a simple production method.

Anodic alumina is a porous aluminum oxide layer (alumite), having multiple pores on its surface.

A mold with anodic alumina on its surface may be formed by steps (a)~(f) below, for example:

(a) a step for forming an oxide layer through anodic oxidation by immersing an aluminum substrate in an electrolyte;

(b) a step for forming pore formation points of anodic oxidation by removing the entire oxide layer;

(c) a step for forming an oxide layer having pores formed in pore formation points by immersing the aluminum substrate again in an electrolyte to anodize the substrate;

(d) a step for enlarging the diameter of pores;

(e) a step for anodizing the substrate again in an electrolyte after step (d); and (f) a step for repeating steps (d) and (e).

Figure 4:
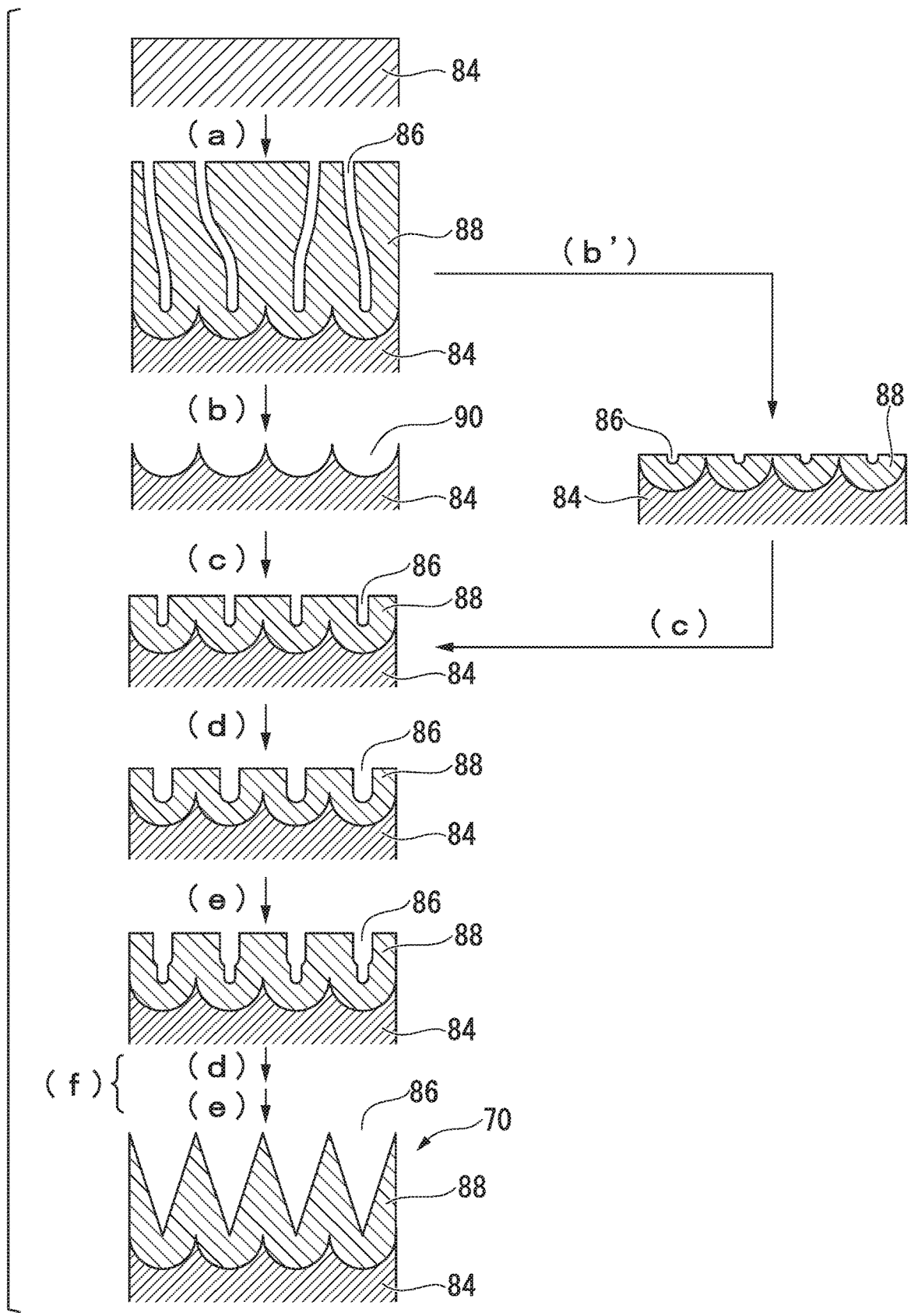
FIG. 4 is a view schematically showing steps for producing a mold having anodic alumina on its surface.

Step (a):

As shown in FIG. 4, oxide layer 88 is formed to have pores 86 by anodizing aluminum substrate 84.

The purity of the aluminum is preferred to be at least 99%, more preferably at least 99.5%, especially preferably at least 99.8%. If the purity of the aluminum is low, when it is anodized the uneven formation may result in a size that scatters visible light because of deflection by impurities, or the pores formed by anodization may result in irregular sizes.

Electrolytes may be solutions of sulfuric acid, oxalic acid, phosphoric acid or the like.

Step (b):

As shown in FIG. 4, the entire oxide layer 88 is removed to form pore formation points 90 during anodization. Accordingly, pore regularity is enhanced.

To remove the oxide layer, an option is to use a solution that does not dissolve aluminum but dissolves oxide layers selectively; for example, a chromic acid/phosphoric acid mixed solution may be used.

Step (c):

As shown in FIG. 4, aluminum substrate 84 is again anodized after the removal of the oxide layer. Accordingly, oxide layer 88 having cylindrical pores 86 is formed.

The same type of electrolyte as in step (a) may be used.

Step (d):

As shown in FIG. 4, a process for enlarging the diameter of pores 86 (hereinafter referred to as a "pore enlargement process") is conducted. A pore enlargement process is conducted by immersing the aluminum substrate in a solution that dissolves the oxide layer so as to enlarge the diameter of pores obtained through anodization. An example of such a solution is a phosphoric acid solution with an approximate concentration of 1 mol/L.

Step (e):

As shown in FIG. 4, anodization is again conducted. Accordingly, cylindrical pores 86 are extended downward from their bottoms, further forming cylindrical pores 86 with a smaller diameter.

The same type of electrolyte as in step (a) may be used.

Step (f):

As shown in FIG. 4, by repeating the pore enlargement process in step (d) and anodization process in step (e), mold 70 is formed, having anodic alumina with pores 86 whose diameter continuously decreases from the pore opening toward the bottom (porous aluminum oxide layer (alumite)). It is preferred to complete the whole process by conducting step (d).

The number of repeating procedures is at least three times in total, more preferably at least five times. If the number of repeating procedures is two or fewer, the pore diameter will decrease discontinuously. As a result, the effects of lowering the reflectance are not obtained sufficiently in cured resin layer 66 formed using anodic alumina having such pores.

The surface of anodic alumina may be treated with a release agent so that peeling from cured resin layer 66 is easier. The surface may be treated by coating a silicone resin or fluorine-containing polymer, depositing a fluorine-containing compound, coating a fluorine-containing silane compound, or the like.

The shape of pores 86 is preferred to be substantially conical, pyramid-like, cylindrical or the like. Especially preferred is a conical or pyramid-like pore, where the area of the pore cross section cut in a direction perpendicular to the depth direction continuously decreases from the outermost surface toward the bottom.

The average depth of pores 86 is preferred to be 80 nm to 500 nm, more preferably 120 nm to 400 nm, especially preferably 150 nm to 300 nm.

The pitch (average distance between adjacent pores) of pores 86 is set to be no greater than the wavelength of visible light, namely, no greater than 400 nm, preferably no greater than 200 nm, more preferably no greater than 150 nm. The pitch of pores 86 is preferred to be at least 20 nm.

The aspect ratio (average depth of pores/pitch of pores) of pores 86 is preferred to be 0.8 to 5.0, more preferably 1.2 to 4.0, especially preferably 1.5 to 3.0.

When pores 86 as shown in FIG. 4 are transferred, the surface of cured resin layer 66 shows a so-called moth-eye formation.

The method for forming a mold is not limited to the above, and step (b) may be replaced with step (b'), for example.

(b'): a step for removing part of the oxide layer.

As shown in FIG. 4, pores 86 of oxide layer 88 formed in step (a) show distance variations. Thus, in step (b'), irregular portions are removed (that is, the surface of oxide layer 88 is removed until no variation is observed in the distance between pores 86). Pores 86 exposed in the surface by step (b') work as pore formation points 90 in step (b).

To remove part of oxide layer 88, a chromic acid/phosphoric acid mixture or a phosphoric acid solution may be used to dissolve oxide layer 88.

(Active Energy Ray-Curable Resin Composition)

Active energy ray-curable resin composition contains a polymerizable compound and polymerization initiator.

Examples of a polymerizable compound are monomers containing radical polymerizable bonds and/or cationic polymerizable bonds in the molecule, oligomers, reactive polymers and the like.

Active energy ray-curable resin compositions may also contain non-reactive polymers or active energy ray sol-gel reactive compositions.

Monomers having a radical polymerizable bond are monofunctional or polyfunctional monomers.

Examples of a monofunctional monomer are (meth)acrylate derivatives such as methyl (meth)acrylate, ethyl (meth)acrylate, propyl (meth)acrylate, n-butyl (meth)acrylate, i-butyl (meth) acrylate, s-butyl (meth) acrylate, t-butyl (meth)acrylate, 2-ethylhexyl (meth)acrylate, lauryl (meth) acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth) acrylate, hydroxypropyl (meth)acrylate, 2-methoxyethyl (meth)acrylate, and 2-ethoxyethyl (meth)acrylate; (meth) acrylic acid; (meth)acrylonitrile; styrene derivatives such as styrene, and α-methyl styrene; (meth)acrylamide derivatives such as (meth)acrylamide, N-dimethyl (meth)acrylamide, N-diethyl (meth)acrylamide, dimethylaminopropyl (meth) acrylamide; and so on. They may be used alone or in combination thereof.

Examples of a polyfunctional monomer are bifunctional monomers such as ethylene glycol di(meth)acrylate, tripropylene glycol di(meth)acrylate, ethylene oxide-modified isocyanurate di(meth)acrylate, triethylene glycol di(meth) acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth) acrylate, polybutylene glycol di(meth)acrylate, 2,2-bis(4-(meth)acryloxy polyethoxy phenyl)propane, 2,2-bis(4-(meth)acryloxy ethoxyphenyl)propane, 2,2-bis(4-(3-(meth) acryloxy-2-hydroxypropoxy)phenyl)propane, 1,2-bis(3-(meth)acryloxy-2-hydroxypropoxy)ethane, 1,4-bis(3-(meth) acryloxy-2-hydroxypropoxy)butane, dimethylol tricyclodecane di(meth)acrylate, bisphenol A-ethylene oxide adduct di(meth)acrylate, bisphenol A-propylene oxide adduct di(meth)acrylate, hydroxypivalic acid neopentyl glycol di(meth)acrylate, divinylbenzene, and methylene bisacrylamide; trifunctional monomers such as pentaerythritol tri (meth)acrylate, trimethylolpropane tri(meth)acrylate, ethylene oxide-modified trimethylolpropane tri(meth)acrylate, propylene oxide-modified trimethylolpropane triacrylate, ethylene oxide-modified trimethylolpropane triacrylate, and ethylene oxide-modified isocyanurate tri(meth)acrylate; tetrafunctional or higher functional monomers such as condensation reaction mixture of succinic acid/trimethylolethane/acrylic acid, dipentaerythritol hexa(meth)acrylate, dipentaerythritol penta(meth)acrylate, ditrimethylolpropane tetraacrylate, and tetramethylolmethane tetra(meth)acrylate; bifunctional or higher functional urethane acrylates, bifunctional or higher functional polyester acrylates, and the like. They may be used alone, or in combination thereof.

As for a monomer having a cationic polymerizable bond, preferred monomers are those having an epoxy group, oxetanyl group, oxazolyl group, vinyloxy group or the like. Monomers having an epoxy group are especially preferable.

As for an oligomer or reactive polymer, examples are unsaturated polyesters such as condensation products of polyhydric alcohols and unsaturated dicarboxylic acids; polyester (meth)acrylates, polyether (meth)acrylates, polyol (meth)acrylates, epoxy (meth)acrylates, urethane (meth) acrylate, cationic polymerizable epoxy compounds, homopolymers or copolymers of the aforementioned monomers having a radical polymerizable bond in a side chain, and the like.

As for a non-reactive polymer, examples are acrylic resins, styrene resins, polyurethanes, cellulose resins, polyvinyl butyrals, polyesters, thermoplastic elastomers, and the like.

Examples of an active energy ray sol-gel reactive composition are alkoxysilane compounds, alkyl silicate compounds, and the like.

Alkoxysilane compounds are those represented by formula (1) below.

$$R^{11}{}_x Si(OR^{13})_y \quad (1)$$

In the above formula, $R^{11}$ and $R^{12}$ are each a $C_1 \sim C_{10}$ alkyl group, and "x" and "y" are integers that satisfy x+y=4.

Examples of an alkoxysilane compound are tetramethoxysilane, tetra-i-propoxysilane, tetra-n-propoxysilane, tetra-n-butoxysilane, tetra-s-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, trimethylbutoxysilane, and the like.

Alkyl silicate compounds are preferred to be those represented by formula (2) below.

$$R^{21}O[Si(OR^{23})(OR^{24})O]_z R^{22} \quad (2)$$

In the above formula, $R^{21} \sim R^{24}$ are each a $C_1 \sim C_5$ alkyl group, and "z" is an integer of 3~20.

Examples of an alkyl silicate compound are methyl silicate, ethyl silicate, isopropyl silicate, n-propyl silicate, n-butyl silicate, n-pentyl silicate, acetyl silicate, and the like.

If photo-curing reactions are employed, photopolymerization initiators such as follows may be used: carbonyl compounds such as benzoin, benzoin methyl ether, benzoin ethyl ether, benzoin isopropyl ether, benzoin isobutyl ether, benzyl, benzophenone, p-methoxy benzophenone, 2,2-diethoxy acetophenone, α,α-dimethoxy-α-phenyl acetophenone, methylphenyl glyoxylate, ethylphenyl glyoxylate, 4,4'-bis(dimethylamino)benzophenone, and 2-hydroxy-2-methyl-1-phenylpropane-1-one; sulfur compounds such as tetramethylthiuram monosulfide, tetramethylthiuram disulfide; 2,4,6-trimethylbenzoyl diphenyl phosphine oxide, benzoyl ethoxy phosphine oxide, and the like. They may be used alone, or in combination thereof.

When electron beam curing reactions are employed, polymerization initiators such as follows may be used: thioxanthones such as benzophenone, 4,4-bis(diethylamino) benzophenone, 2,4,6-trimethyl benzophenone, methyl-ortho-benzoylbenzoat, 4-phenyl benzophenone, t-butyl anthraquinone, 2-ethyl anthraquinone, 2,4-diethyl thioxanthone, isopropyl thioxanthone, and 2,4-dichloro thioxanthone; acetophenones such as diethoxyacetophenone, 2-hydroxy-2-methyl-1-phenylpropane-1-one, benzyl dimethyl ketal, 1-hydroxycyclohexyl-phenyl ketone, 2-methyl-2-morpholino(4-thiomethylphenyl)propan-1-one, and 2-benzyl-2-dimethylamino-1-(4-morpholinophenyl)-butanone; benzoin ethers such as benzoin methyl ether, benzoin ethyl ether, benzoin isopropyl ether, and benzoin isobutyl ether; acyl phosphine oxides such as 2,4,6-trimethylbenzoyl diphenylphosphine oxide, bis(2,6-dimethoxybenzoyl)-2,4,4-trimethylpentylphosphine oxide, and bis(2,4,6-trimethylbenzoyl)phenylphosphine oxide; methyl benzoyl formate, 1,7-bis-acridinyl heptane, 9-phenyl acridine, and the like. They may be used alone or in combination thereof.

When thermosetting reactions are employed, examples of a thermal polymerization initiator are organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate, and lauroyl peroxide; azo compounds such as azobisisobutyronitrile; redox polymerization initiators obtained by combining the aforementioned organic peroxides with amines such as N,N-dimethylaniline and N,N-dimethyl-p-toluidine.

If applicable, active energy ray-curable resin compositions may contain additives such as anti-static agents, release agents, and fluorine compounds to improve antifouling properties, as well as fine particles and a small amount of solvents.

(Hydrophobic Material)

If water repellency (specifically, a water contact angle of at least 90°) is required on the surface of the fine uneven formation, fluorine-containing compounds or silicone compounds are preferred to be used as active energy ray-curable resin compositions capable of forming a hydrophobic material.

Fluorine-containing Compound:

Fluorine-containing compounds are preferred to be a fluoroalkyl-group-containing compound represented by formula (3) below.

$$-(CF_2)_n-X \quad (3)$$

In the above formula, "X" indicates a fluorine or hydrogen atom, "n" is an integer of 1 or greater, preferably 1~20, more preferably 3~10, especially preferably 4~8.

Examples of a fluorine-containing compound are fluorine-containing monomers, fluorine-containing silane compounds, fluorine-containing surfactants, fluorine-containing polymers, and the like.

Fluorine-containing monomers are fluoroalkyl group-substituted vinyl monomers, fluoroalkyl group-substituted ring-opening polymerizable monomers, and the like.

Examples of a fluoroalkyl group-substituted vinyl monomer are fluoroalkyl group-substituted (meth)acrylates, fluoroalkyl group-substituted (meth)acrylamides, fluoroalkyl group-substituted vinyl ethers, fluoroalkyl group-substituted styrenes, and the like.

As for a fluoroalkyl group-substituted ring-opening polymerizable monomer, fluoroalkyl group-substituted epoxy compounds, fluoroalkyl group-substituted oxetane compounds, fluoroalkyl group-substituted oxazoline compounds, and the like may be used.

Fluorine-containing monomers are preferred to be fluoroalkyl group-substituted (meth)acrylates, especially preferably those represented by formula (4) below.

$$CH_2=C(R^{41})C(O)O-(CH_2)_m-(CF_2)_n-X \quad (4)$$

$R^{41}$ indicates a fluorine atom or a methyl group, "X" is a hydrogen or fluorine atom, "m" is an integer of 1~6, preferably 1~3, more preferably 1 or 2, and "n" is an integer of 1 or greater, preferably 1~20, more preferably 3~10, especially preferably 4~8.

Fluorine-containing silane compounds are preferred to be fluoroalkyl group-substituted silane compounds, especially preferably those represented by formula (5) below.

$$(R^f)_a-R^{51}{}_bSiY_c \quad (5)$$

$R^f$ indicates a $C_1~C_{20}$ fluorine-substituted alkyl group that may contain one or more ether bonds or ester bonds. Examples of $R^f$ are 3,3,3-trifluoropropyl group, tridecafluoro-1,1,2,2-tetrahydrooctyl group, 3-trifluoromethoxypropyl group, 3-trifluoroacetoxy propyl group and the like.

$R^{51}$ indicates a $C_1~C_{10}$ alkyl group. Examples of $R^{51}$ are a methyl group, ethyl group, cyclohexyl group and the like.

"Y" indicates a hydroxyl group or a hydrolyzable group.

Examples of a hydrolyzable group are an alkoxy group, a halogen atom, $R^{52}C(O)O$ and the like ($R^{52}$ indicates a hydrogen atom or a $C_1~C_{10}$ alkyl group).

Examples of an alkoxy group are a methoxy group, ethoxy group, propyloxy group, i-propyloxy group, butoxy group, i-butoxy group, t-butoxy group, pentyloxy group, hexyloxy group, cyclohexyloxy group, heptyloxy group, octyloxy group, 2-ethylhexyloxy group, nonyloxy group, decyloxy group, 3,7-dimethyloctyloxy group, lauryloxy group and the like.

A halogen atom may be Cl, Br, I, or the like.

$R^{52}C(O)O$ may be $CH_3C(O)O$, $C_2H_5C(O)O$, or the like.

In the formula, "a", "b" and "c" are each integers that satisfy a+b+c=4 and a≥1, c≥1, preferably a=1, b=0, and c=3.

Examples of a fluorine-containing silane coupling agent are 3,3,3-trifluoropropyl trimethoxy silane, 3,3,3-trifluoropropyl triacetoxy silane, dimethyl-3,3,3-trifluoropropyl methoxysilane, tridecafluoro-1,1,2,2-tetrahydrooctyl triethoxysilane, and the like.

As for the fluorine-containing surfactant, it may be fluoroalkyl group-containing anionic surfactants, fluoroalkyl group-containing cationic surfactants and the like.

Examples of a fluoroalkyl group-containing anionic surfactant are $C_2~C_{10}$ fluoroalkyl carboxylic acids or their metal salts, perfluorooctane sulfonyl glutamic acid disodium, 3-[omega-fluoroalkyl ($C_6~C_{11}$)oxy]-1-alkyl ($C_3~C_4$) sulfonate, 3-[omega-fluoroalkanoyl ($C_6~C_8$)-N-ethylamino]-1-propanesulfonate, fluoroalkyl ($C_{11}~C_{20}$) carboxylic acids or their metal salts, perfluoroalkyl ($C_7~C_{13}$) carboxylic acids or their metal salts, perfluoroalkyl ($C_4~C_{12}$) sulfonic acids or their metal salts, perfluorooctane sulfonate diethanolamide, N-propyl-N-(2-hydroxyethyl) perfluorooctane sulfonamide, perfluoroalkyl ($C_6~C_{10}$)sulfonamide propyltrimethyl ammonium salts, perfluoroalkyl ($C_6~C_{10}$)-N-ethyl sulfonyl glycine salts, monoperfluoroalkyl ($C_6~C_{16}$) ethylphosphates, and the like.

Examples of a fluoroalkyl group-containing cationic surfactant are fluoroalkyl group-containing aliphatic primary, secondary or tertiary amino acids, aliphatic quaternary ammonium salts such as perfluoroalkyl ($C_6~C_{10}$) sulfonamide propyl trimethyl ammonium salts, benzalkonium salts, benzethonium chlorides, pyridinium salts, imidazolinium salts, and the like.

Examples of a fluorine-containing polymer are polymers of fluoroalkyl group-containing monomers, copolymers of a fluoroalkyl group-containing monomer and a poly(oxyalkylene) group-containing monomer, copolymers of a fluoroalkyl group-containing monomer and a crosslinking reactive group-containing monomer, and the like. Fluorine-containing polymers may be a copolymer with other copolymerizable monomers.

A fluorine-containing polymer is preferred to be a copolymer of a fluoroalkyl group-containing monomer and a poly(oxyalkylene) group-containing monomer.

As for a poly(oxyalkylene) group, those represented by formula (6) below are preferred.

$$-(OR^{61})_p \quad (6)$$

$R^{61}$ indicates a $C_2~C_4$ alkylene group, "p" is an integer of 2 or greater. $R^{61}$ may be $-CH_2CH_2-$, $-CH_2CH_2CH_2-$, $-CH(CH_3)CH_2-$, $-CH(CH_3)CH(CH_3)-$, or the like.

The poly(oxyalkylene) group may be structured with the same oxyalkylene unit ($OR^{61}$), or two or more types of oxyalkylene units ($OR^{61}$). Two or more types of oxyalkylene units ($OR^{61}$) may be in a block or random sequence.

Silicone Compound:

Examples of a silicone compound are (meth)acrylic acid modified silicones, silicone resins, silicone-based silane coupling agents and the like.

As for (meth)acrylic acid modified silicones, a silicone di(meth)acrylate such as X-22-1602 (Shin-Etsu Chemical Co., Ltd.) or the like may be used.

(Hydrophilic Material)

If hydrophilic properties (specifically, a water contact angle of no greater than 25 degrees) is required on the surface of a fine uneven formation, tetrafunctional or higher functional (meth)acrylates, bifunctional or higher functional hydrophilic (meth)acrylates, or monofunctional monomers if applicable, are preferred to be used as active energy ray-curable resin compositions capable of forming a hydrophilic material.

Examples of a tetrafunctional or higher functional (meth) acrylate are ditrimethylolpropane tetra(meth)acrylate, pentaerythritol tetra(meth)acrylate, pentaerythritol ethoxy tetra (meth)acrylate, dipentaerythritol hydroxy penta(meth) acrylate, dipentaerythritol hexa(meth)acrylate, condensation reaction mixture of succinic acid/trimethylolethane/acrylic acid at a molar ratio of 1:2:4, urethane acrylates (Daicel-Cytec Company Ltd.: Ebecryl 220, EBECRYL 1290, Ebecryl 1290K, Ebecryl 5129, Ebecryl 8210, Ebecryl 8301, IRM 8200), polyether acrylates (Daicel-Cytec: Ebecryl 81), modified epoxy acrylates (Daicel-Cytec: Ebecryl 3416), polyester acrylates (Daicel-Cytec: Ebecryl 450, Ebecryl 657, Ebecryl 800, Ebecryl 810, Ebecryl 811, Ebecryl 812, Ebecryl 1830, Ebecryl 845, Ebecryl 846, Ebecryl 1870), and the like. They may be used alone, or in combination thereof.

As for tetrafunctional or higher functional (meth)acrylates, pentafunctional or higher functional (meth)acrylates are more preferred.

Examples of a bifunctional or higher functional hydrophilic (meth)acrylate are long-chain polyethylene glycol-containing polyfunctional acrylates, polyethylene glycol methacryates and the like, for example, Aronix M-240 and Aronix M-260 (Toagosei Co., Ltd.), NK Ester AT-20E and NK Ester ATM-35E (Shin-Nakamura Chemical Co., Ltd.). They may be used alone or in combination thereof.

In a polyethylene glycol dimethacrylate, the sum of the average repeating units of the polyethylene glycol chain present in one molecule is preferred to be 6 to 40, more preferably 9 to 30, especially preferably 12 to 20. If the average number of repeating units of the polyethylene glycol chain is at least 6, sufficient hydrophilic properties are obtained, and antifouling properties are improved. When the average repeating units of the polyethylene glycol chain are no greater than 40, compatibility with tetrafunctional or higher functional (meth)acrylates is improved, and dissociation of the active energy ray-curable resin composition seldom occurs.

Monofunctional monomers are preferred to be hydrophilic.

Examples of a hydrophilic monofunctional monomer are cationic monomers such as monofunctional (meth)acrylates having a polyethylene glycol chain in the ester group, for example, M-20G, M-90G and M-230G (Shin-Nakamura Chemical), monofunctional (meth)acrylates having a hydroxyl group in the ester group such as hydroxyalkyl (meth)acrylates, monofunctional acrylamides, methacrylamide propyl trimethyl ammonium methyl sulfate, and methacryloyloxyethyl trimethylammnonium methyl sulfate.

In addition, monofunctional monomers such as follows may be used: viscosity adjusters such as acryloylmorpholine and vinylpyrrolidone, and adhesiveness enhancers such as acryloyl isocyanates to improve adhesiveness with the substrate.

One or more monofunctional monomers may be (co) polymerized to obtain a polymer with a low polymerization degree, which is then blended into an active energy ray-curable resin composition. Polymers with a low polymerization degree are, for example, a 40/60 copolymerized oligomer (MG polymer, MRC UNITEC Co., Ltd.) of a monofunctional (meth)acrylate having a polyethylene glycol chain in the ester group such as M-230G (Shin-Nakamura Chemical), and methacrylamide propyl trimethyl ammonium methyl sulfate.

<Method for Producing Electrode Substrate>

Electrode substrate 50 is produced when a transparent conductive film is formed by depositing ITO or the like on the surface of substrate body 52, and then the conductive film is patterned to make desired electrode patterns to be used as first transparent electrode 54 and second transparent electrode 56.

<Effects>

Image display apparatus 10 described above is structured to have touch panel 40, which has a fine uneven formation with a pitch of no greater than 400 nm on the surface facing liquid-crystal panel (image display apparatus main body) 20. As a result, reflection of light is suppressed on the opposing surfaces of liquid-crystal panel 20 and touch panel 40.

In addition, in the aforementioned image display apparatus 10, liquid-crystal panel 20 and touch panel 40 are secured to each other using adhesive member 30 described above. Thus, if necessary, liquid-crystal panel 20 and touch panel 40 are easily detached, and adhesive member 30 is also easily removed from the surface of touch panel 40.

Accordingly, when touch panel 40 and liquid-crystal panel 20 are laminated off the intended position, it is easier to detach touch panel 40 and liquid-crystal panel 20 from each other, which are then laminated again to take the intended position without being wasted.

Also, after image display apparatus 10 is assembled, if a defect is found either in touch panel 40 or in liquid-crystal panel 20, it is easier to detach touch panel 40 and liquid-crystal panel 20 and to replace the defective one.

According to the aforementioned image display apparatus 10, when touch panel 40 having a fine uneven formation on its surface is employed, liquid-crystal panel 20 and touch panel 40 are easily detached from each other if necessary, while adhesive member 30 is also easily removed from the surface of touch panel 40. Moreover, image display apparatus 10 with improved visibility is produced at high yield.

Other Embodiments

The image display apparatus according to the present invention is not limited to image display apparatus 10 as shown in the drawings.

For example, the image display apparatus main body is not limited to being a liquid-crystal panel, but it may be plasma display panel, organic EL display panel, CRT or the like. Also, the liquid-crystal panel is not limited to being liquid-crystal panel 20 shown in the drawings. It is an option to replace liquid-crystal panel 20 with any known image display panel.

Also, the touch panel is not limited to being a capacitive touch screen, and may be a resistive touch screen.

Furthermore, the capacitive touch panel is not limited to being the touch panel 40 shown in the drawing, but it may be any known capacitive touch panel.

Yet furthermore, a fine uneven formation may be arranged on the input surface of touch panel 40 by laminating a low reflection film on the input surface of touch panel 40.

The fine uneven formation is arranged on the cured resin layer surface of low reflection film in the example, but it may be formed directly on the base film without forming a cured resin layer. Alternatively, it is an option not to laminate a low reflection film but to arrange the uneven formation directly on a surface of touch panel 40. However, it is preferred to have a fine uneven formation on the cured resin layer surface of low reflection film, because such a formation is efficiently formed by using a roll-type mold 70 as shown in FIG. 3, and because a low reflection film can be replaced when the uneven formation is damaged.

If a fine uneven formation is arranged on the surface of touch panel 40 without laminating a low reflection film thereon, the fine uneven formation may be made as the surface pattern of the second transparent electrode of touch panel 40.

In addition, the low reflection film is not limited to being that obtained by the method described above, and may be formed by making a fine uneven formation on a base film using any known method (nanoimprinting, cutting, etching or the like).

EXAMPLES

In the following, the present invention is described in detail by referring to examples. However, the present invention is not limited to those examples.

<Measuring Pores of Anodic Alumina>

Part of the anodic alumina was cut and the cross section was deposited with platinum for one minute. The cross section was observed using a field emission scanning electron microscope (JSM-7400F, JEOL, Ltd.) under conditions set to have an acceleration voltage of 3.00 kV. Distances between pores and depths of pores were measured at 50 spots, and their average values were obtained.

<Measuring Convex Portions of Cured Resin Layer>

Platinum was deposited for 10 minutes on a fractured surface of the cured resin layer to observe the cross section the same as with anodic alumina. Distances between convex portions and heights of convex portions were measured at 50 spots, and average values were obtained.

<Measuring Bond Strength>

Bond strength was measured as follows in accordance with JIS Z0237:2009 (ISO 29862 and ISO 29863).

An adhesive member was cut into a 25 mm×150 mm piece, which was laminated on an adherend by rolling a 2 kg roller back and forth one time. The laminate was left standing for 30 minutes under a constant temperature of 23° C. Then, the adhesive film was peeled off the surface of the adherend in a 180-degree direction. The force (peel force) required for peeling was measured and set as the bond strength.

Example 1

<Producing Mold (a)>

The aforementioned steps (a)-(f) were conducted to obtain a plate-shaped mold (a) on which anodic alumina was formed, having multiple substantially conical pores with a pitch (average distance) of 100 nm and an average depth of 190 nm.

The mold (a) was immersed in a 0.1 mass % diluted solution of Optool DSX (Daikin Industries, Ltd.), and air-dried overnight so that the anodic alumina surface was treated with a release agent.

<Preparing Active Energy Ray-Curable Resin Composition (A)>

An active energy ray-curable resin composition (A) was prepared by mixing the following:

dipentaerythritol hexaacrylate (Shin-Nakamura Chemical Co., Ltd.): 25 parts by mass;
pentaerythritol triacrylate (DKS Co., Ltd.): 25 parts by mass;
ethylene oxide modified dipentaerythritol hexaacrylate (Nippon Kayaku Co., Ltd.): 25 parts by mass;
polyethylene glycol diacrylate (Shin-Nakamura Chemical): 25 parts by mass
1-hydroxycyclohexyl phenyl ketone (Irgacure 184, BASF Japan): 1 part by mass;
bis(2,4,6-trimethylbenzoyl)-phenylphosphine oxide (Irgacure 819, BASF Japan): 0.5 parts by mass.

<Producing Low Reflection Film (X)>

An active energy ray-curable resin composition (A) was coated on the surface of the mold (a), on which a 100 μm-thick polyethylene terephthalate film with a substrate strength of 250 MPa was covered.

Using an ultraviolet irradiation device (fusion lamp with a D bulb), ultraviolet rays were irradiated through the film at a cumulative amount of light of 1000 mJ/cm$^2$ to cure the active energy ray-curable resin composition "A", which was then detached from the mold (a). Accordingly, low reflection film (X) was obtained having a 7 μm-thick cured resin layer, on whose surface a fine uneven formation with multiple conical convex portions was formed.

The convex portions had a pitch (average distance) of 100 nm, and an average height of 180 nm.

(Measuring Bond Strength)

An adhesive member (A) prepared by laminating acrylic adhesive layers (first and second adhesive layers) on either side of a PET substrate was laminated to the cured resin layer side of the low reflection film (X). Then, its peel strength was measured and set as bond strength (W5) between the second adhesive layer and the touch panel. The results are shown in Table 1.

Separately, the adhesive member (A) was laminated on a polycarbonate plate and its peel strength was measured. As shown in FIG. 1, the liquid-crystal panel used in the present example was structured to have first polarizing film 24 on the image-display side. When the inventors of the present invention measured the peel strength using a film with the same material as that of the outermost layer of the first polarizing film (the layer exposed when a liquid-crystal panel is assembled), it was confirmed that the peel strength was substantially the same as that measured with a polycarbonate plate. Accordingly, in the present example, the peel strength measured with a polycarbonate plate was set as bond strength (W1) between the first adhesive layer and the liquid-crystal panel. The results are shown in Table 1.

<Producing Electrode Substrate>

A 30 nm-thick ITO film was formed on both surfaces of a 1 mm-thick glass plate by a reactive sputtering method conducted in a 0.4 Pa atmosphere consisting of 98 vol % of argon gas and 2 vol % of tin oxide by using a sintered material made of 97 mass % of indium oxide and 3 mass % of tin oxide.

Next, a photoresist with a striped pattern was coated on the ITO films, dried and cured. Then, the glass plate having ITO film on both sides was immersed for one minute in 5 mass % hydrochloric acid at 25° C. so as to etch the films. Accordingly, a transparent electrode with patterned ITO films was obtained.

(Producing Image Display Apparatus)

A capacitive touch panel was assembled by consecutively laminating the low reflection film (X), electrode substrate and a 3 mm-thick glass plate as the cover glass, and by connecting a detector member to the transparent electrode.

Next, using the same type of adhesive member (A) as that used for measuring bond strength, a capacitive touch panel was laminated to be secured onto the image-display side of a liquid-crystal panel with a backlight in such a way that the low reflection film (X) of the touch panel faced the liquid-crystal panel. Accordingly, an image display apparatus was assembled. The touch panel and liquid-crystal panel were secured to each other on their peripheries.

When the touch panel and liquid-crystal panel of an image display apparatus were detached from each other, rupture or the like of the substrate of adhesive member (A) did not occur, and the adhesive member (A) remained stuck to the touch panel. From those results, adhesive member (A) is found to have bond strength (W1) between the first adhesive layer and the liquid-crystal panel that is less than any of bond strength (W3) between the first adhesive layer and the substrate, bond strength (W3') between the second adhesive layer and the substrate, and bond strength (W5) between the second adhesive layer and the touch panel. Also, bond strength (W1) is found to be less than rupture strength (W4) of the substrate.

When the surface of the detached liquid-crystal panel was observed, a trace of the first adhesive layer (adhesive residue) was observed in the area where adhesive member (A) was attached, but such adhesive residue was easily removed when the liquid-crystal panel was wiped with ethanol.

Based on the criteria below, evaluation was conducted on how the touch panel and the liquid-crystal panel were detached from each other. The results are shown in Table 1.
(Detachment of Touch Panel and Liquid-Crystal Panel)
  A: The adhesive member remains stuck to the surface of a touch panel, and the adhesive residue on the surface of a liquid-crystal panel is easy to remove.
  B: The adhesive member remains stuck to the surface of a touch panel, but the adhesive residue on the surface of a liquid-crystal panel cannot be removed.
  C: The adhesive member remains stuck to the surface of a liquid-crystal panel.

Next, when the adhesive member (A) was removed from the touch panel, rupture or the like of the substrate of adhesive member (A) did not occur, and the adhesive member (A) was removed from the touch panel. From those results, adhesive member (A) is found to have rupture strength (W4) that is greater than at least bond strength (W5). In addition, bond strength (W5) is found to be less than either of bond strength (W3) and bond strength (W3').

When the surface of the detached touch panel was observed, a trace of the second adhesive layer (adhesive residue) was observed in the area where adhesive member (A) was attached, but such adhesive residue was easily removed when the touch panel surface was wiped with ethanol.

Based on the criteria below, an evaluation was conducted on how the adhesive member was peeled from the touch panel and on how the adhesive residue was removed from the detached touch panel. The results are shown in Table 1. "TP" in the table is an abbreviation of touch panel.
(Peeling Adhesive Member from Touch Panel)
  A: The adhesive member is peeled from the surface of a touch panel without causing substrate rupture.
  C: The substrate ruptures, or the adhesive member cannot be peeled from the surface of a touch panel.
(Adhesive Residue on Touch Panel
  A: The adhesive residue is easy to remove when the surface of a touch panel is wiped with ethanol.
  B: The adhesive residue is difficult to remove when the surface of a touch panel is wiped with ethanol.
  C: On the surface of a touch panel, the second adhesive layer and ruptured substrate, or the adhesive member itself, remain and cannot be removed when the surface is wiped with ethanol.

Next, an image display apparatus was assembled by putting back the detached touch panel and liquid-crystal panel by using the adhesive member. It was confirmed that the touch panel and liquid-crystal panel worked without showing any trouble, reflection was suppressed on the screen, and clear images were achieved.

Example 2

Bond strengths were measured the same as in Example 1 except for using an adhesive member (B), formed with acrylic adhesive layers (first and second adhesive layers) which have stronger adhesive force than those of adhesive member (A) and are disposed on either surface of a PET substrate. The results are shown in Table 1.

An image display apparatus was assembled the same as in Example 1 except for using the adhesive member (B).

When the touch panel and liquid-crystal panel of the image display apparatus were detached from each other, the rupture or the like of the substrate did not occur in adhesive member (B), and the adhesive member (B) remained stuck to the touch panel. From those results, adhesive member (B) is found to have bond strength (W1) between the first adhesive layer and the liquid-crystal panel that is less than any of bond strength (W3) between the first adhesive layer and the substrate, bond strength (W3') between the second adhesive layer and the substrate, and bond strength (W5) between the second adhesive layer and the touch panel. Also, bond strength (W1) is found to be less than rupture strength (W4) of the substrate.

When the surface of the detached liquid-crystal panel was observed, slight adhesive residue was observed in the area where adhesive member (B) was attached, but such adhesive residue was easily removed when the surface of the liquid-crystal panel was wiped with ethanol. The results are shown in Table 1.

Next, when the adhesive member (B) was peeled from the touch panel, rupture or the like of the substrate did not occur in adhesive member (B), and the adhesive member (B) was peeled from the touch panel. From those results, adhesive member (B) is found to have rupture strength (W4) that is greater than at least bond strength (W5). In addition, bond strength (W5) is found to be less than either of bond strength (W3) and bond strength (W3').

When the surface of the detached touch panel was observed, slight adhesive residue was observed in the area where adhesive member (B) was attached, but such adhesive residue was easily removed when the touch panel surface was wiped with ethanol. The results are shown in Table 1.

Next, an image display apparatus was assembled by bonding the detached touch panel and liquid-crystal panel using the adhesive member again. It was confirmed that the touch panel and liquid-crystal panel worked without any trouble, reflection was suppressed on the screen, and clear images were achieved.

Example 3

Bond strengths were measured the same as in Example 2 except for using an adhesive member (C), formed with acrylic adhesive layers (first and second adhesive layers) which have stronger adhesive force than those of adhesive member (B) and are disposed on either surface of a PET substrate. The results are shown in Table 1.

An image display apparatus was assembled the same as in Example 1 except for using the adhesive member (C).

When the touch panel and liquid-crystal panel of the image display apparatus were detached from each other, rupture or the like of the substrate did not occur in adhesive member (C), and the adhesive member (C) remained stuck to the touch panel. From those results, adhesive member (C) is found to have bond strength (W1) between the first adhesive layer and the liquid-crystal panel that is less than any of bond strength (W3) between the first adhesive layer and the substrate, bond strength (W3') between the second adhesive layer and the substrate, and bond strength (W5) between the second adhesive layer and the touch panel. Also, bond strength (W1) is found to be less than rupture strength (W4) of the substrate.

When the surface of the detached liquid-crystal panel was observed, slight adhesive residue was observed in the area where adhesive member (C) was attached, but such adhesive residue was easily removed when the surface of the liquid-crystal panel was wiped with ethanol. The results are shown in Table 1.

Next, when the adhesive member (C) was peeled from the touch panel, rupture or the like of the substrate did not occur in adhesive member (C), and the adhesive member (C) was peeled from the touch panel. From those results, adhesive member (C) is found to have rupture strength (W4) that is greater than at least bond strength (W5). In addition, bond strength (W5) is found to be less than either of bond strength (W3) and bond strength (W3').

When the surface of the detached touch panel was observed, slight adhesive residue was observed in the area where adhesive member (C) was attached, but such adhesive residue was easily removed when the surface of the touch panel was wiped with ethanol. The results are shown in Table 1.

Next, an image display apparatus was assembled again by securing the detached touch panel and liquid-crystal panel by laminating them with the adhesive member. It was confirmed that the touch panel and liquid-crystal panel worked without any trouble, reflection was suppressed on the screen, and clear images were achieved.

Comparative Example 1

Bond strengths were measured the same as in Example 1 except for using an adhesive member (D), formed using the same acrylic adhesive layers (first and second adhesive layers) as those of adhesive member (A) that are disposed on either surface of a polyolefin foam substrate having a substrate strength of 30 MPa. However, measuring the peel strength using a low reflection film failed since the substrate of adhesive member (D) had ruptured. The results are shown in Table 1.

An image display apparatus was assembled the same as in Example 1 except for using the adhesive member (D).

When the touch panel and liquid-crystal panel of the image display apparatus were detached from each other, rupture or the like of the substrate did not occur in adhesive member (D), and the adhesive member (D) remained stuck to the touch panel. From those results, adhesive member (D) is found to have bond strength (W1) between the first adhesive layer and the liquid-crystal panel that is less than any of bond strength (W3) between the first adhesive layer and the substrate, bond strength (W3') between the second adhesive layer and the substrate and bond strength (W5) between the second adhesive layer and the touch panel. Also, bond strength (W1) is found to be less than rupture strength (W4) of the substrate.

When the surface of the detached liquid-crystal panel was observed, slight adhesive residue was observed in the area where adhesive member (D) was attached, but such adhesive residue was easily removed when the surface of the liquid-crystal panel was wiped with ethanol. The results are shown in Table 1.

Next, when the adhesive member (D) was peeled from the touch panel, the substrate of adhesive member (D) ruptured, and the second adhesive layer and part of the ruptured substrate could not be removed from the touch panel. From those results, adhesive member (D) is found to have rupture strength (W4) that is less than any of bond strength (W3), bond strength (W3') and bond strength (W5).

Moreover, an attempt failed in an effort to remove the second adhesive layer and the ruptured substrate remaining on the touch panel surface by using ethanol. The results are shown in Table 1.

Since the second adhesive layer and the ruptured substrate were not removed from the touch panel, another image display apparatus could not be assembled from the detached touch panel and liquid-crystal panel.

Comparative Example 2

Bond strengths were measured the same as in Example 1 except for using an adhesive member (E), formed using the same acrylic adhesive layers (first and second adhesive layers) as those of adhesive member (A) that are disposed on either surface of a nonwoven-fabric substrate with a substrate strength of 8 MPa. However, measuring the peel strength using a low reflection film failed since the substrate of adhesive member (E) had ruptured. The results are shown in Table 1.

An image display apparatus was assembled the same as in Example 1 except for using the adhesive member (E).

When the touch panel and liquid-crystal panel of the image display apparatus were detached from each other, rupture or the like of the substrate did not occur in adhesive member (E), and the adhesive member (E) remained stuck to the touch panel. From those results, adhesive member (E) is found to have bond strength (W1) between the first adhesive layer and the liquid-crystal panel that is less than any of bond strength (W3) between the first adhesive layer and the substrate, bond strength (W3') between the second adhesive layer and the substrate, and bond strength (W5) between the second adhesive layer and the touch panel. Also, bond strength (W1) is found to be less than rupture strength (W4) of the substrate.

When the surface of the detached liquid-crystal panel was observed, slight adhesive residue was observed in the area where adhesive member (E) was attached, but such adhesive residue was easily removed when the surface of the liquid-crystal panel was wiped with ethanol. The results are shown in Table 1.

Next, when the adhesive member (E) was peeled from the touch panel, the substrate of adhesive member (E) ruptured, and the second adhesive layer and part of the ruptured substrate could not be peeled from the touch panel. From those results, adhesive member (E) is found to have rupture strength (W4) that is less than any of bond strength (W3), bond strength (W3') and bond strength (W5).

Moreover, an attempt failed in an effort to remove the second adhesive member and the ruptured substrate remaining on the surface of the touch panel by using ethanol. The results are shown in Table 1.

Since the second adhesive layer and the ruptured substrate were not removed from the touch panel, another image display apparatus could not be assembled from the detached touch panel and liquid-crystal panel.

Comparative Example 3

Bond strengths were measured the same as in Example 1 except for using an adhesive member (F), formed with acrylic adhesive layers (first and second adhesive layers) which have stronger adhesive force than those of adhesive member (C) and are disposed on either surface of a PET substrate. The results are shown in Table 1.

adhesive member (F) was attached, and such adhesive residue could not be removed when the surface of the touch panel was wiped with ethanol. The results are shown in Table 1.

Comparative Example 4

An image display apparatus was prepared the same as in Example 1 except for using a scatter-preventing PET film instead of a low reflection film having a fine uneven formation. Due to greater reflectance on the image display apparatus screen, what was on the screen was difficult to see. The luminance was 4% lower. Also, when the screen was pushed with a finger, interference patterns appeared even when viewed from the front.

TABLE 1

|  | Substrate of adhesive member | Substrate strength (W4) | Detachment of liquid-crystal panel and TP | Peel strength (W3') | Detached position | Removal of adhesive member from TP | Peel strength (W3) | Detached position | Adhesive residue on TP |
|---|---|---|---|---|---|---|---|---|---|
| Example 1 | PET | 250 MPa | A | 5 | W5 | A | 12 | W2 | A |
| Example 2 | PET | 250 MPa | A | 9 | W5 | A | 11.2 | W2 | A |
| Example 3 | PET | 250 MPa | A | 11 | W5 | A | 13.6 | W2 | A |
| Comp. Example 1 | polyolefin foam | 20 MPa | A | 9.5 | W5 | C | — | W4 | C |
| Comp. Example 2 | non-woven fabric | 8 MPa | A | 4 | W5 | C | — | W4 | C |
| Comp. Example 3 | PET | 250 MPa | A | 11.5 | W5 | A | 14.4 | W3 | B |

An image display apparatus was assembled the same as in Example 1 except for using the adhesive member (F).

When the touch panel and liquid-crystal panel of the image display apparatus were detached from each other, rupture or the like of the substrate did not occur in adhesive member (F), and the adhesive member (F) remained stuck to the touch panel. From those results, adhesive member (F) is found to have bond strength (W1) between the first adhesive layer and the liquid-crystal panel that is less than any of bond strength (W3) between the first adhesive layer and the substrate, bond strength (W3') between the second adhesive layer and the substrate, and bond strength (W5) between the second adhesive layer and the touch panel. Also, bond strength (W1) is found to be less than rupture strength (W4) of the substrate.

When the surface of the detached liquid-crystal panel was observed, slight adhesive residue was observed in the area where adhesive member (F) was attached, but such adhesive residue was easily removed when the surface of the liquid-crystal panel was wiped with ethanol. The results are shown in Table 1.

Next, when the adhesive member (F) was peeled from the touch panel, rupture or the like of the substrate of adhesive member (F) did not occur, and the adhesive member (F) was peeled from the touch panel. From those results, adhesive member (F) is found to have rupture strength (W4) that is greater than at least bond strength (W5). In addition, bond strength (W5) is found to be less than either of bond strength (W3) and bond strength (W3').

When the surface of the detached touch panel was observed, adhesive residue was observed in the area where

INDUSTRIAL APPLICABILITY

According to the present invention, when an image display apparatus is provided to have a touch panel that has a fine uneven formation on its surface, it is easier to detach the image display apparatus main body and the touch panel if necessary, and it is also easier to remove the adhesive member from the touch panel surface.

In addition, the image display apparatus related to the present invention is structured to have a touch panel disposed on the front side.

DESCRIPTION OF NUMERICAL REFERENCES

10 image display apparatus (image display apparatus with touch panel)
20 liquid-crystal panel (image display apparatus main body)
30 adhesive member
32 substrate
34 first adhesive layer
36 second adhesive layer
40 touch panel
62 convex portion (fine uneven formation)
H average height
P pitch (average distance)

What is claimed is:
1. A laminate, comprising:
   a first member having a plurality of convex portions on its surface;

a second member positioned to face the first member with a space disposed in between; and an adhesive member to secure the first member and the second member to each other, wherein, the average height of the plurality of convex portions is 80 nm to 500 nm, the average distance between adjacent convex portions is 20 nm to 400 nm, the aspect ratio (average height/pitch) is 0.8 to 5.0, the adhesive member is configured to have a substrate, a first adhesive layer laminated on one surface of the substrate, and a second adhesive layer laminated on the other surface of the substrate, the first member and the second member are secured to each other by setting the first adhesive layer to be in contact with the surface of the first member having a plurality of convex portions and setting the second adhesive layer to be in contact with the surface of the second member, when the rupture strength of the substrate of the adhesive member is set as (F1), the peel strength between the first member and the adhesive member as (F2), and the peel strength between the second member and the adhesive member as (F3), (F1), (F2), and (F3) satisfy the following relationships:

$F2 < 13 N/10$ mm;

$F3 < F2 < F1$.

2. The laminate according to claim 1, wherein the rupture strength of the substrate of the adhesive member is at least 100 MPa.

3. The laminate according to claim 1, wherein when the bond strength between the first member and the first adhesive layer is set as (W1), the rupture strength of the first adhesive layer as (W2), the bond strength between the substrate and the first adhesive layer as (W3), the bond strength between the substrate and the second adhesive layer as (W3'), the rupture strength of the second adhesive layer as (W2'), and the bond strength with the second member as (W5), (W5) is set to be less than any of (W1), (W2), (W2'), (W3) and (W3').

4. The laminate according to claim 1, wherein when the bond strength between the first member and the first adhesive layer is set as (W1), the rupture strength of the first adhesive layer as (W2), and the bond strength between the substrate and the first adhesive layer as (W3), (W1) is set to be less than either of (W2) and (W3).

5. The laminate according to claim 1, wherein when the bond strength between the first member and the first adhesive layer is set as (W1), the rupture strength of the first adhesive layer as (W2), and the bond strength between the substrate and the first adhesive layer as (W3), (W2) is set to be less than either of (W1) and (W3).

6. The laminate according to claim 5, wherein the adhesive agent of the first and second adhesive layers is soluble in water or alcohol.

7. The laminate according to claim 1, wherein when the bond strength between the first member and the first adhesive layer is set as (W1), the rupture strength of the first adhesive layer as (W2), and the bond strength between the substrate and the first adhesive layer as (W3), (W3) is set to be less than either of (W1) and (W2).

8. The laminate according to claim 7, wherein the adhesive agent of the first and second adhesive layers is soluble in water or alcohol.

9. The laminate according to claim 3, wherein (W5) is set at 1 to 13 N/10 mm.

10. The laminate according to claim 1, wherein the bond strength between the first adhesive layer and the first member is set at 3 to 14 N/10 mm.

11. The laminate according to claim 1, wherein the adhesive agent of the first and second adhesive layers is soluble in water or alcohol.

12. The laminate according to claim 1, wherein the first and second adhesive layers are made of the same adhesive agent.

13. The laminate according to claim 1, wherein on the side of the first member surface having a plurality of convex portions, the refractive index continuously increases from the tip to the bottom of the plurality of convex portions.

14. The laminate according to claim 1, wherein the first member is a touch panel, the second member is an image display apparatus main body, and the plurality of convex portions are formed on the touch panel surface facing the image display apparatus main body.

* * * * *